(12) United States Patent
Cropper et al.

(10) Patent No.: US 10,129,106 B2
(45) Date of Patent: *Nov. 13, 2018

(54) MANAGEMENT OF VIRTUAL MACHINE RESOURCES IN COMPUTING ENVIRONMENTS

(71) Applicant: International Business Machines Corporation, Armonk, NY (US)

(72) Inventors: Joseph W. Cropper, Rochester, MN (US); Susan F. Crowell, Rochester, MN (US); Jason A. Nikolai, Rochester, MN (US); Andrew T. Thorstensen, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 475 days.

This patent is subject to a terminal disclaimer.

(21) Appl. No.: 14/272,968

(22) Filed: May 8, 2014

(65) Prior Publication Data

US 2015/0295792 A1    Oct. 15, 2015

Related U.S. Application Data

(63) Continuation of application No. 14/248,545, filed on Apr. 9, 2014.

(51) Int. Cl.
*G06F 15/16* (2006.01)
*H04L 12/24* (2006.01)
(Continued)

(52) U.S. Cl.
CPC ...... *H04L 41/5054* (2013.01); *G06F 9/45558* (2013.01); *H04L 41/5022* (2013.01); *H04L 43/0817* (2013.01); *G06F 2009/45591* (2013.01)

(58) Field of Classification Search
CPC ......................... H04L 67/10; G06F 2009/4557
See application file for complete search history.

(56) References Cited

U.S. PATENT DOCUMENTS 8,209,687 B2   6/2012   Yuyitung et al.
8,429,276 B1   4/2013   Kumar et al.
(Continued)

OTHER PUBLICATIONS

Abdul-Rahman et al., "Live Migration-based Resource Managers for Virtualized Environments: A Survey", Cloud Computing 2010: The First International Conference on Cloud Computing, GRIDs, and Virtualization, pp. 32-40, © IARIA 2010, (ISBN: 978-1-61208-106-9).

(Continued)

*Primary Examiner* — Moustafa M Meky
*Assistant Examiner* — Sm Z Islam
(74) *Attorney, Agent, or Firm* — Christopher M. Coy

(57) ABSTRACT

Embodiments of the present disclosure call for a method, a system, and a computer program product for managing virtual resources for a virtual machine of interest on a physical server. The method includes monitoring a plurality of physical servers, on a computing system. Each physical server provides an initial level of virtual resources to a plurality of virtual machines. The method also includes receiving a requested level of virtual resources for a virtual machine of interest hosted by a first physical server from the plurality of physical servers. The method also includes determining whether the first physical server is able to host the requested level of virtual resources for the virtual machine of interest. The method also includes determining, in response to the first physical server not being able to host the requested level of resources for the virtual machine of interest, a path.

12 Claims, 12 Drawing Sheets

(51) Int. Cl.
G06F 9/455 (2018.01)
H04L 12/26 (2006.01)

(56) References Cited

U.S. PATENT DOCUMENTS

| | | | |
|---|---|---|---|
| 8,533,713 | B2 | 9/2013 | Dong |
| 8,732,699 | B1* | 5/2014 | Hyser .................. G06F 9/5077 718/1 |
| 2003/0055718 | A1* | 3/2003 | Cimini .................. G06Q 10/06 705/7.38 |
| 2006/0069761 | A1 | 3/2006 | Singh et al. |
| 2006/0114961 | A1* | 6/2006 | Manni .................. H01S 3/0941 372/70 |
| 2009/0187775 | A1* | 7/2009 | Ishikawa ............... G06F 1/3203 713/310 |
| 2010/0005465 | A1* | 1/2010 | Kawato .................. G06F 9/455 718/1 |
| 2010/0205240 | A1 | 8/2010 | Loefstrand |
| 2011/0239215 | A1* | 9/2011 | Sugai .................. G06F 9/45558 718/1 |
| 2011/0245953 | A1* | 10/2011 | Metzger ........... G05B 19/41875 700/103 |
| 2012/0151476 | A1* | 6/2012 | Vincent ............... G06F 9/45558 718/1 |
| 2012/0215728 | A1 | 8/2012 | Isaiadis |
| 2013/0086272 | A1 | 4/2013 | Chen et al. |
| 2013/0138764 | A1* | 5/2013 | Satapathy ........... G06F 9/45558 709/214 |
| 2013/0191527 | A1 | 7/2013 | Ashok et al. |
| 2013/0297802 | A1 | 11/2013 | Laribi et al. |
| 2013/0346973 | A1* | 12/2013 | Oda ...................... G06F 9/4856 718/1 |
| 2014/0082201 | A1 | 3/2014 | Shankari et al. |
| 2014/0137104 | A1* | 5/2014 | Nelson ................ G06F 9/45558 718/1 |
| 2015/0277779 | A1* | 10/2015 | Devarapalli ........ G06F 9/45558 711/162 |

OTHER PUBLICATIONS

Campegiani, P., "A Genetic Algorithm to Solve the Virtual Machines Resources Allocation Problem in Multi-tier Distributed Systems", Second International Workshop on Virtualization Performances: Analysis, Characterization and Tools (VPCAT '09), http://www.paolocampegiani.it/vpact.pdf.

Chuan et al., "A new live virtual machine migration strategy", 2012 International Symposium on Information Technology in Medicine and Education (ITME), pp. 173-176, Aug. 2012, © 2012 IEEE. DOI: 10.1109/ITiME.2012.6291274.

Han et al., "Lightweight Resource Scaling for Cloud Applications", 2012 12th IEEE/ACM International Symposium on Cluster, Cloud and Grid Computing (CGrid), pp. 644-651, May 2012, © 2012 IEEE. DOI: 10.1109/CGrid.2012.52.

Hirofuchi et al., "Enabling Instantaneous Relocation of Virtual Machines with a Lightweight VMM Extension", 2010 10th IEEE/ACM International Conference on Cluster, Cloud and Grid Computing, pp. 73-83, May 2010, © 2010 IEEE. DOI: 10.1109/CGRID.2010.42.

Kranas et al., "ElaaS: An innovative Elasticity as a Service framework for dynamic management across the cloud stack layers", 2012 Sixth International Conference on Complex, Intelligent, and Software Intensive Systems (CISIS), pp. 1042-1049, Jul. 2012, © 2012 IEEE. DOI: 10.1109/CISIS.2012.117.

Li et al., "Informed Live Migration Strategies of Virtual Machines for Cluster Load Balancing", Network and Parallel Computing: 8th IFIP International Federation for Information Processing, NPC 2011, LNCS 6985, pp. 111-122, 2011, Altman and Shi. DOI: 10.1007/978-3-642-24403-2_9.

Mell et al., "The NIST Definition of Cloud Computing", National Institute of Standards and Technology, NIST Special Publication 800-145, Sep. 2011, Gaithersburg, MD.

Shen et al., "CloudScale: Elastic Resource Scaling for Multi-Tenant Cloud Systems", SOCC '11: Proceedings of the 2nd ACM Symposium on Cloud Computing, Article No. 5, © 2011 ACM, New York, NY, USA. DOI: 10.1145/2038916.2038921.

Tarighi et al., "A new model for virtual machine migration in virtualized cluster server based on Fuzzy Decision Making", Journal of Telecommunications, vol. 1, Issue 1, Feb. 2010, pp. 40-51. http://arxiv.org/abs/1002.3329.

Wang et al., "A Decentralized Virtual Machine Migration Approach of Data Centers for Cloud Computing", Mathematical Problems in Engineering, vol. 2013, Research Article, Article ID 878542, Hindawi Publishing Corporation, © 2013 Xiaoying Wang et al. http://dx.doi.org/10.1155/2013/878542.

Wood et al., "Black-box and Gray-box Strategies for Virtual Machine Migration", NSDI '07: Proceedings of the 4th USENIX Conference on Networked System Design and Implementation, Apr. 2007, © 2007 USENIX Association, Berkeley, CA. http://people.cs.umass.edu/~arun/papers/sandpiper.pdf.

Cropper et al., "Management of Virtual Machine Resources in Computing Environments", U.S. Appl. No. 14/248,545, filed Apr. 9, 2014.

Cropper et al., "Management of Virtual Machine Placement in Computing Environments", U.S. Appl. No. 14/248,538, filed Apr. 9, 2014.

Cropper et al., "Management of Virtual Machine Placement in Computing Environments", Filed May 8, 2014.

List of IBM Patents or Patent Applications Treated as Related.

\* cited by examiner

| | UTILIZATION | | | VIRTUAL MACHINES | | |
|---|---|---|---|---|---|---|
| 1ST SERVER | 1 | | | 2 | 3 | 4 |
| 2ND SERVER | | 8 | | | | FREE |
| 3RD SERVER | 11 | | | 5 | FREE | |
| 4TH SERVER | 15 | 16 | 17 | 7 | 3 | |
| | | | | | | 4 |
| PROCESSING RESOURCE | 1 2 3 4 5 6 7 8 9 10 11 12 13 14 | 15 16 17 18 19 20 21 | 22 23 24 25 26 27 28 |

FIG. 10D

| | UTILIZATION | | | VIRTUAL MACHINES |
|---|---|---|---|---|
| 1ST SERVER | 1 | | | |
| 2ND SERVER | | 8 | | FREE |
| 3RD SERVER | 11 | | | 2 FREE |
| 4TH SERVER | 15 | 16 | 17 | 7 4 |
| PROCESSING RESOURCE | 1 2 3 4 5 6 7 8 9 10 11 12 13 14 | 15 16 17 18 19 20 21 | 22 23 24 25 26 27 28 |

MANAGEMENT OF VIRTUAL MACHINE RESOURCES IN COMPUTING ENVIRONMENTS

BACKGROUND

The present disclosure relates to the field of information processing systems, and more particularly relates to managing virtual machines on a network.

Virtual machines (abbreviated VM herein) may help to more efficiently use hardware resources by allowing one computer system to support functions normally performed by multiple separate computer systems. By virtualizing a hardware resource, a single hardware resource may support multiple virtual machines in a flexible manner that provides improved utilization of the hardware resource. Further, if a physical processing resource becomes over-utilized, virtual machines may migrate to other hardware resources that may have processing capacity.

SUMMARY

Embodiments of the present disclosure call for a method, a system, and a computer program product for managing virtual resources for a virtual machine of interest on a physical server.

One embodiment is directed towards a method for managing virtual resources for a virtual machine of interest. The method includes monitoring a plurality of physical servers, on a computing system. Each physical server provides an initial level of virtual resources to a plurality of virtual machines. The method also includes receiving a requested level of virtual resources for a virtual machine of interest hosted by a first physical server from the plurality of physical servers. The method also includes determining whether the first physical server is able to host the requested level of virtual resources for the virtual machine of interest. The method also includes determining, in response to the first physical server not being able to host the requested level of resources for the virtual machine of interest, a path. The path can accommodate the virtual machine of interest and involve a schedule of actions for a plurality of secondary virtual machines on the plurality of physical servers. The path is determined by resizing the plurality of secondary virtual machines to create unallocated virtual resources. The path is also determined by measuring unallocated virtual resources in the plurality of physical servers. The path is also determined by migrating the plurality of virtual machines to the plurality of physical servers with sufficient unallocated virtual resources to accommodate the virtual machine of interest. The method also includes implementing the path for the secondary virtual machines on the plurality of physical servers.

Another embodiment is directed towards a system for managing virtual resources for a virtual machine of interest. The system includes a plurality of physical servers operating in a computing environment. A physical server configured to provide virtual resources at an initial level to a plurality of virtual machines. The system includes a cloud controller that manages virtual resources for the plurality of virtual machines. The cloud controller is further configured to monitor the plurality of physical servers that provide an initial level of virtual resources to the plurality of virtual machines. The cloud controller is further configured to receive a requested level of virtual resources for a virtual machine of interest hosted by a first physical server from the plurality of physical servers. The cloud controller is further configured to determine whether the first physical server is able to host the requested level of virtual resources for the virtual machine of interest. The cloud controller is further configured to determine, in response to the first physical server not being able to host the requested level of resources for the virtual machine of interest, a path to accommodate the virtual machine of interest involving a schedule of actions for a plurality of secondary virtual machines on the plurality of physical servers. The path is determined by resizing the plurality of secondary virtual machines to create unallocated virtual resources. The path is also determined by measuring unallocated virtual resources in the plurality of physical servers. The path is also determined by migrating the plurality of virtual machines to the plurality of physical servers with sufficient unallocated virtual resources to accommodate the virtual machine of interest. The cloud controller is further configured to implement the path for the secondary virtual machines on the plurality of physical servers.

Another embodiment is directed toward a computer program product for managing virtual resources for a virtual machine of interest.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 10A illustrates an initial utilization of the system, according to various embodiments.

FIG. 10B illustrates one iteration of the secondary VMs being migrated, according to various embodiments.

FIG. 10C illustrates one iteration of the secondary VMs, according to various embodiments.

FIG. 10D illustrates the virtual resources of the first VM being increased, according to various embodiments.

Figure 1:
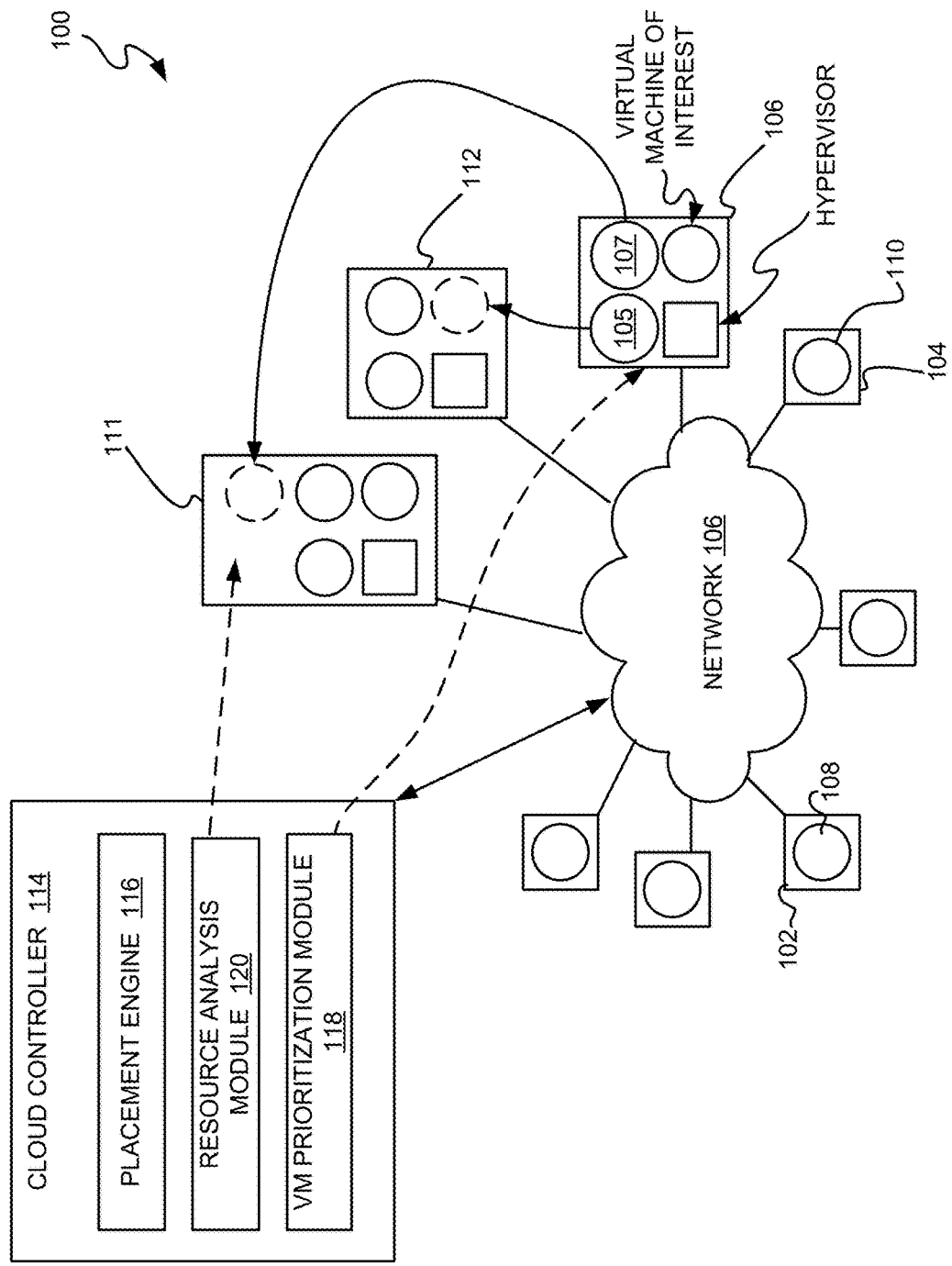
FIG. 1 illustrates an operating environment, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to the field of information processing systems, and more particularly relates to managing virtual machines on a network. A cloud controller receives a request to increase the size of a virtual machine on a physical server. The cloud controller determines whether the other virtual machines that share virtual resources from the physical server can be migrated to other physical servers. Assuming that the other virtual machines can be migrated, the cloud controller migrates the other virtual machines to other physical servers. The virtual resources freed by the migrated virtual machines are allocated to the virtual machine in the request. While the present disclosure is not necessarily limited to such applications, various aspects of the disclosure may be appreciated through a discussion of various examples using this context.

Virtual machines (VMs) can share access to one or more hardware, or virtual, resources. Consistent with various embodiments, a hardware resource can be capable of supporting a particular number of VMs (e.g., before significant degradation of VM performance). The hardware resources that support one or more VMs can be distributed throughout an operating environment. In various embodiments, the hardware resource includes one or more processors devoted to processing computer instructions. For example, a hardware resource can include a processor core, a network adapter, a server blade, input/output devices, a computer, a laptop, processing access time to a mainframe, or combinations thereof. The term virtual resource refers to the resources used by the virtual machine. These virtual resources include a hardware resource from a physical server. Aspects of the present disclosure use the term virtual resource and hardware resource interchangeably.

FIG. 1 illustrates an operating environment, according to various embodiments. In particular, FIG. 1 shows an operating environment 100 comprising a plurality of hardware resources such as a first hardware resource 102 and a second hardware resource 104. The term hardware resource may be used interchangeably with the term physical server. Consistent with embodiments, the hardware resources 102, 104, 106, 111, 112, includes (data) server devices, processor cores, I/O devices, storage devices and combinations thereof. Each of the plurality of hardware resources, e.g., 102, 104, can be communicatively coupled to a network 106. The network 106 can refer at least to a data center network, a cloud network, or a cloud-computing network. The network 106 has, but is not limited to, a three-tier architecture. Network 106 can use a variety of protocols and architectures including, but not limited to, are Ethernet, Virtual Local Area Network (VLAN), Virtual Layer 2 (VL2), PortLand, or BCube.

The network 106 further communicates with a cloud controller 114. The cloud controller 114 is the front-end system responsible for gathering and aggregating preliminary data required to start a provisioning process. Initially, this information can be provided by an administrator as part of the creation process and is specific to each type of workflow used for provisioning. For example, the cloud controller 114 gathers information that includes VM location, class of application (web server, database server, mail server, etc.), and minimum resource requirements. The cloud controller 114 further works with the hypervisors in the hardware resource to manage the placement of virtual machines. The cloud controller 114 can also be referred to as a management application or cloud management application. The term computing environment can also refer to a cloud computing environment or distributed computing environment.

The cloud controller 114 has a placement engine 116. The placement engine 116 controls the placement of virtual machines to a hardware resource. In various embodiments, the placement engine 116 controls the migration of the virtual machines in a cloud computing environment. Examples of a placement engine may also include an optimization engine, a Backup Recovery Solution (BRS) component, or a Hyper-V® hypervisor component. It can be understood that management tools used in a virtualization management software may implicitly have a placement engine but not necessarily a named component.

The cloud controller 114 also has a VM prioritization module 118. The VM prioritization module 118 determines the priority assigned to a virtual machine relative to other virtual machines. In various embodiments, the priority of the virtual machine can be dependent on factors such as a percent utilization of the virtual machine, or of the hardware resource. The VM prioritization module 118 communicates with the placement engine 116 to determine where the VM is located within the cloud computing environment.

The cloud controller 114 also contains a resource analysis module 120. The resource analysis module 120 analyzes the distribution of virtual resources to the virtual machines. The resource analysis module 120 may also be responsible for determining an availability score for hardware resources that is targeted to accept a VM.

In various embodiments, the one or more virtual machines (VMs) 108, 110 can use the hardware resources 102, 104 in the plurality of hardware resources. The virtual machine is a software-based computer. Virtual machines may be based on specifications of a hypothetical computer or emulate the computer architecture and functions of a real world computer. Each virtual machine can interface with the hardware resource through the hypervisor. The hypervisor can be software, firmware, or hardware or a combination thereof that is configured to create and run VMs. The hypervisor can map the VM to the hardware resource. A VM can exist in a static configuration where the VM is allocated a set amount of hardware resources. If the VM is in the static configuration, then the VM can be defined by two measurements, an allocation of hardware resources, and a utilization of the allocated hardware resources. In a variable configuration, the VM can be allocated the hardware resources at a particular level. Any unused hardware resources can be distributed to other VMs within the network 106. In various embodiments, the total amount of hardware resources allocated to a plurality of VMs may be more than the hardware resources provided. The over allocation of hardware resources may depend on the likelihood of all VMs using the overage at the same time.

A virtual machine can be migrated from one hypervisor mapped to a hardware resource to another hypervisor mapped to another hardware resource to allow more virtual machines using fewer hardware resources. As a virtual machine is migrated from one hypervisor to another, then a new switching device that is a part of the new hypervisor can associate with the migrated VM. The switching device is not moved.

A virtual machine can be deactivated by the cloud controller 114. In various embodiments, the network 106 can be turned over/reset at periodic intervals. For example, the data center network 106 can have a policy where the network 106 is reset at least once per month. Other data center networks can reset the network 106 at different time intervals, e.g., multiple times per day.

Hardware resource 106 has three virtual machines and a hypervisor. One of the virtual machines is the virtual machine of interest. In various embodiments, the virtual machine of interest can have its hardware resources increased to an increased level. The virtual machine of interest may initiate the increase. When the increase is requested, the other secondary virtual machines, 105, 107, on the hardware resource 106 have to be migrated away, resized, or some combination thereof, in order to allow the virtual machine of interest to have its virtual resources increased. For example, while migrating the secondary virtual machines, 105, 107, the virtual machine prioritization module 118 can determine the priority of the virtual machine, e.g., 105, 107, using performance factors such as hardware resource usage. In the operating environment 100 example, the VM prioritization module 118 prioritizes virtual machine 105 as a first priority, and the virtual machine 107 on the hardware resource 106 a second priority.

Once the virtual machines 105, 107 are prioritized, the resource analysis module 120 evaluates performance factors to determine an availability score for each hardware resource to which a VM can migrate, e.g., 111, 112. Once the resource analysis module 120 determines the availability score for each hardware resource, 111, 112, then the resource analysis module 120 can prioritize the hardware resource for each VM based on the availability score. For example, the virtual machine 105 may have preference to migrate to hardware resource 112 but not to hardware resource 111. The resource analysis module 120 communicates with the placement engine 116 to migrate the VMs. After virtual machine 105 is migrated to hardware resource 112, then the virtual machine 107 is migrated to hardware resource 111. Once the virtual machines 105, 107, are migrated away from the hardware resource 106, the virtual resources for the virtual machine of interest can be increased.

In various embodiments, the cloud controller 114 can monitor all of the virtual machines and hardware resources in the operating environment 100 to determine the most appropriate migrations and resizing for secondary virtual machines. For example, the cloud controller 114 can select a path that has the least amount of migrations necessary to accommodate the increased level of hardware resources for the virtual machine of interest. The path is a combination of migrating and resizing virtual machines in the operating environment 100 for a hardware resource to accommodate the virtual machine of interest. The path can also include migrating the virtual machine of interest to a hardware resource with more virtual resources.

Figure 2:
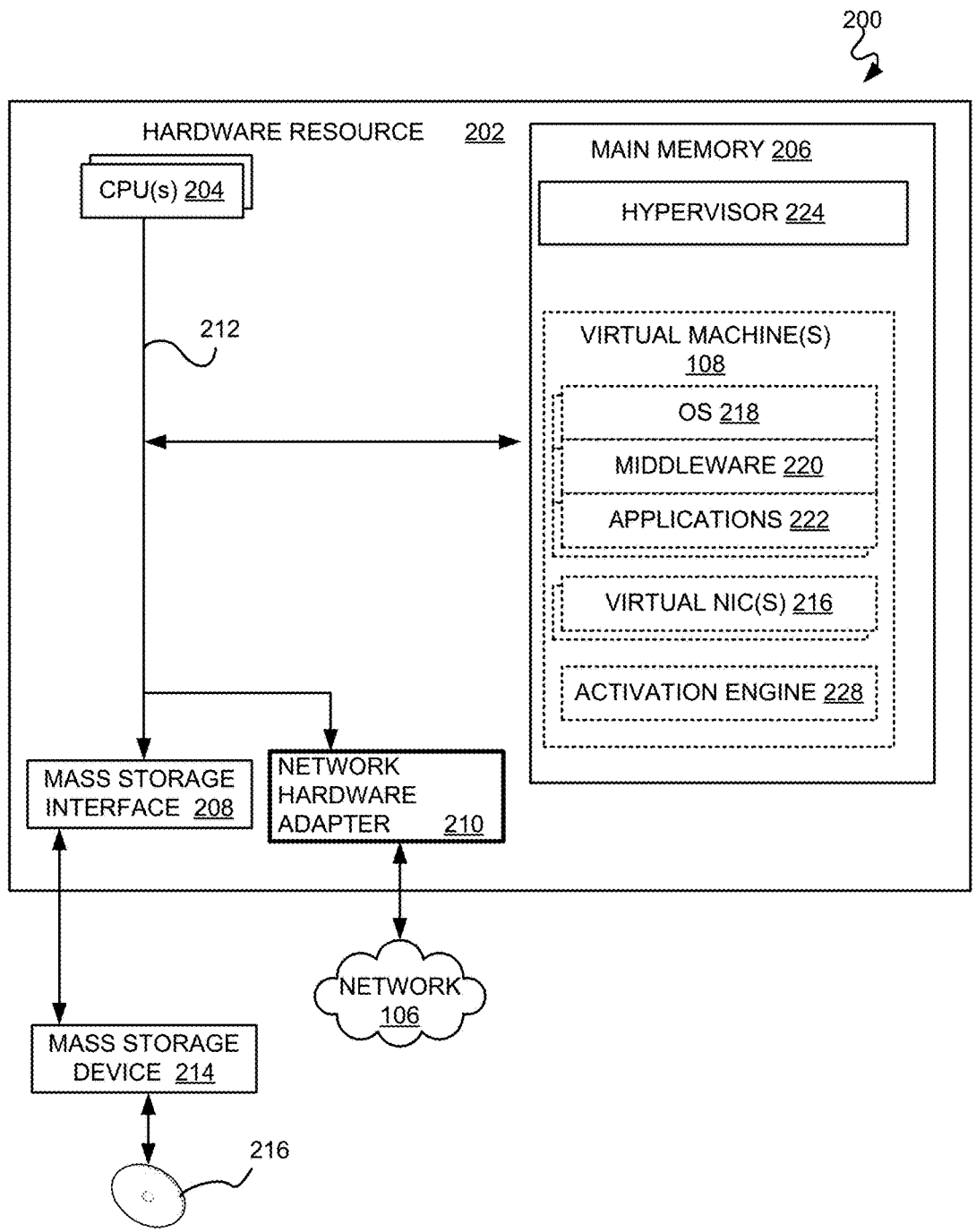
FIG. 2 illustrates a block diagram illustrating a detailed view of hardware resources from an operating environment, according to various embodiments.

FIG. 2 illustrates a block diagram 200 illustrating a detailed view of a hardware resource, according to various embodiments. The computer 202 illustrated in FIG. 2 is an example of an embodiment of the hardware resources of FIG. 1, such as hardware resources 102, 104. The computer 202 has a processor(s) 204 that is connected to a main memory 206, mass storage interface 208, and network adapter hardware 210. A system bus 212 interconnects these system components. The mass storage interface 208 is used to connect mass storage devices, such as mass (data) storage device 214, to the hardware resource 202. One specific type of data storage device is an optical drive such as a CD/DVD drive, which can be used to store data to and read data from a computer readable medium or storage product such as (but not limited to) a CD/DVD 216. Another type of data storage device is a data storage device configured to support, for example, File Allocation Table (FAT)-type file system operations.

Although only one CPU 204 is illustrated for the hardware resource 202, computer systems with multiple CPUs can be used equally effectively. Various embodiments of the present disclosure are able to use any other suitable operating systems as well. The network adapter hardware 210 is used to provide an interface to one or more networks 106. Various embodiments of the present disclosure are able to be adapted to work with any data communications connections including present day analog and/or digital techniques or via a future networking mechanism. Although one or more embodiments of the present disclosure are discussed in the context of a fully functional computer system, those skilled in the art will appreciate that embodiments are capable of being distributed as a program product via CD or DVD, e.g., CD 216, CD ROM, or other form of recordable media, or via any type of electronic transmission mechanism.

The main memory 206 can include several software applications such as those denoted with dashed lines. The main memory 206 can include a hypervisor 224, a virtual machine 108 and a virtual Network Interface Card (vNIC) 216. A virtual machine 108 can be a discrete execution environment within a single computer to make the computer function as if it were two or more independent computers. Each virtual machine 108 is assigned the resources it needs to operate as though it were an independent computer, including processor time, memory, an operating system, and the like. Each virtual machine 108 includes an operating system 218, middleware 220, applications 222, an activation engine 228, and the like. Each virtual machine 108 can support specific guest operating systems and multiple user sessions for executing software written to target the guest operating systems. For example, one virtual machine can support an instance of the Linux® operating system, while a second virtual machine executes an instance of the z/OS® operating system. Other guest operating systems can also be supported as well.

The hardware resource 202 may also have an operating system that is at a lower-level than operating system 218. The hardware resource operating system is a layer of system software that schedules threads and provides functions for making system resources available to threads, including memory access, access to input/output resources, and the like. The hardware resource operating system can also control allocation and authorization for access to computer resources. The hardware resource operating system can perform low-level basic tasks such as recognizing input from a keyboard, sending output to a display screen, keeping track of files and directories on a magnetic disk drive, and controlling peripheral devices such as disk drives and printers.

The hardware resource operating system is also responsible for security, ensuring that unauthorized users do not access the system and that threads access only resources they are authorized to access. Operating systems useful for scheduling threads in a multi-threaded computer according to embodiments of the present disclosure are multi-threading operating systems, examples of which include UNIX®, Linux®, Microsoft NT™, AIX®, IBM's i5/OS™, and many others.

The middleware 220 is software that connects multiple software applications for exchanging data. Middleware 220 can include application servers, content management systems, web servers, and the like. Applications 222 are any software programs running on top of the middleware 220.

A virtual machine 108 can also have an activation engine 228. The activation engine 228 can be used by the virtual machine 108 to set addresses in a static configuration, discussed further herein. The activation engine 228 can create, read, and execute metadata specified in a configuration. The activation engine 228 is an enablement framework used for boot-time customization of virtual images that is processed after the initial system boot. It is used to customize the configuration settings of a system by performing functions, such as starting the network interface, creating non-default user accounts along with their permissions, and creating new file systems.

The activation engine 228, along with the virtual image templates, allows a system administrator to use a single virtual image as a source of deployment for multiple systems that can be customized with their own parameters, such as network addresses, custom file systems, and user accounts. The activation engine 228 is fully expandable, which means that the default virtual image template can be modified to add custom rules, execute custom scripts, or even add new templates that are processed at boot time.

The activation engine 228 script can be used to parse the default virtual image template file, process all rules, and execute subsequent scripts that are linked to the processed rules. The activation engine 228 supports the XML format of the template, which serves as a launch pad for calling pre-defined or user-created system customization scripts, with the script parameters being hosted in the virtual image template. The activation engine 228 can also use comma-separated value format, etc. The activation engine 228 can also apply the address received from the cloud controller 114. According to various embodiments, the activation engine 228 may not be required by the virtual machine 108 if further customization is not required. For example, if the virtual machine uses DHCP and does not need to do anything when it boots, then an activation engine 228 may not even be required.

The main memory 206 also includes a hypervisor 224. The hypervisor 224 is a layer of system software, firmware, or hardware that runs under the operating system and the virtual machines 108. That is, a hypervisor 224 runs between an operating system 218 and underlying hardware resources including physical processors 204. The hypervisor 224, among other things, can manage virtual machines 108. Although only one hypervisor 224 is shown, each virtual machine 108 can also have its own hypervisor.

The hardware resource 202 can have a network hardware adapter 210 to manage the communication between the virtual machine 108 and the network 106. The network hardware adapter 210 can be a network interface card or another device.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
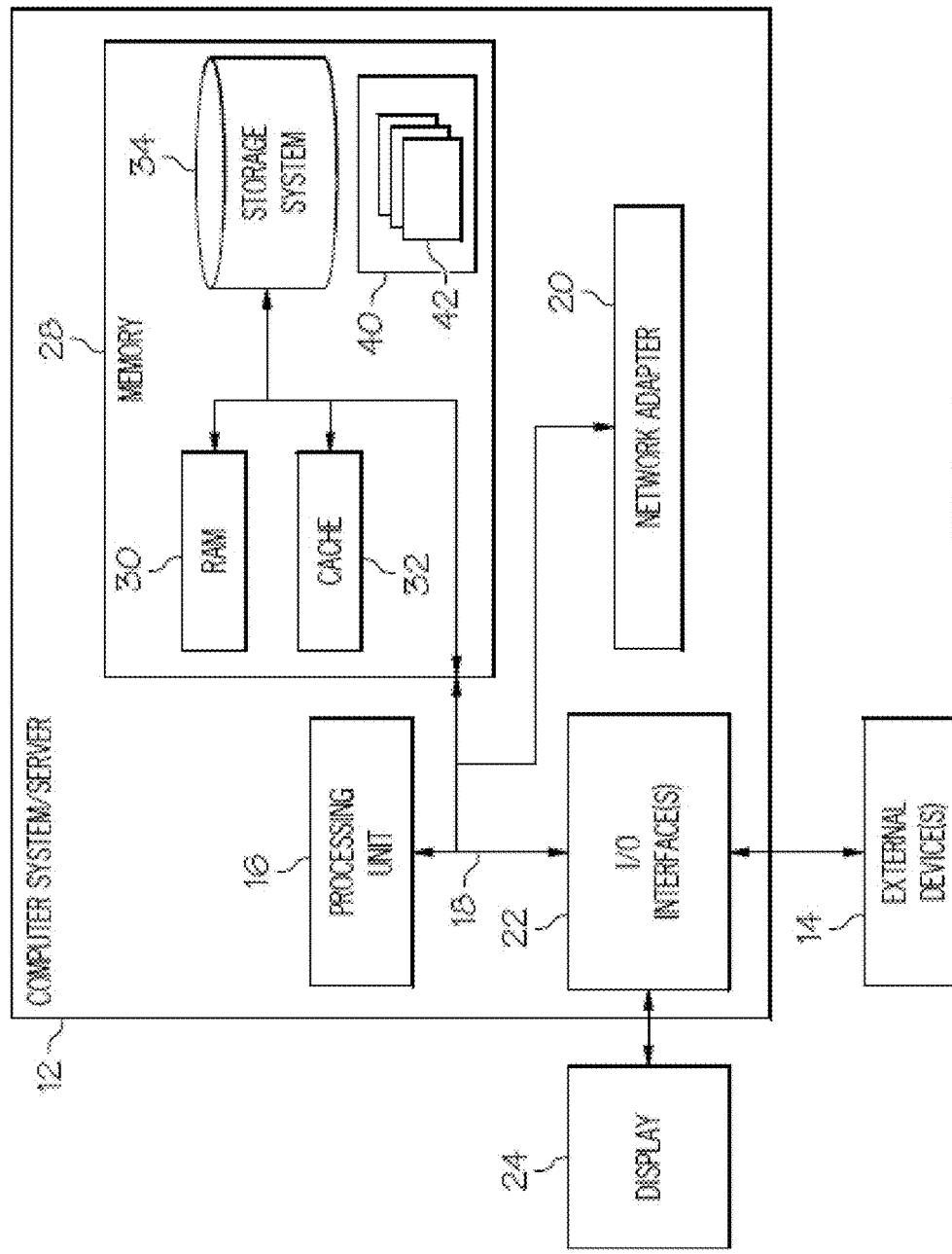
FIG. 3 illustrates a cloud computing node, according to various embodiments.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
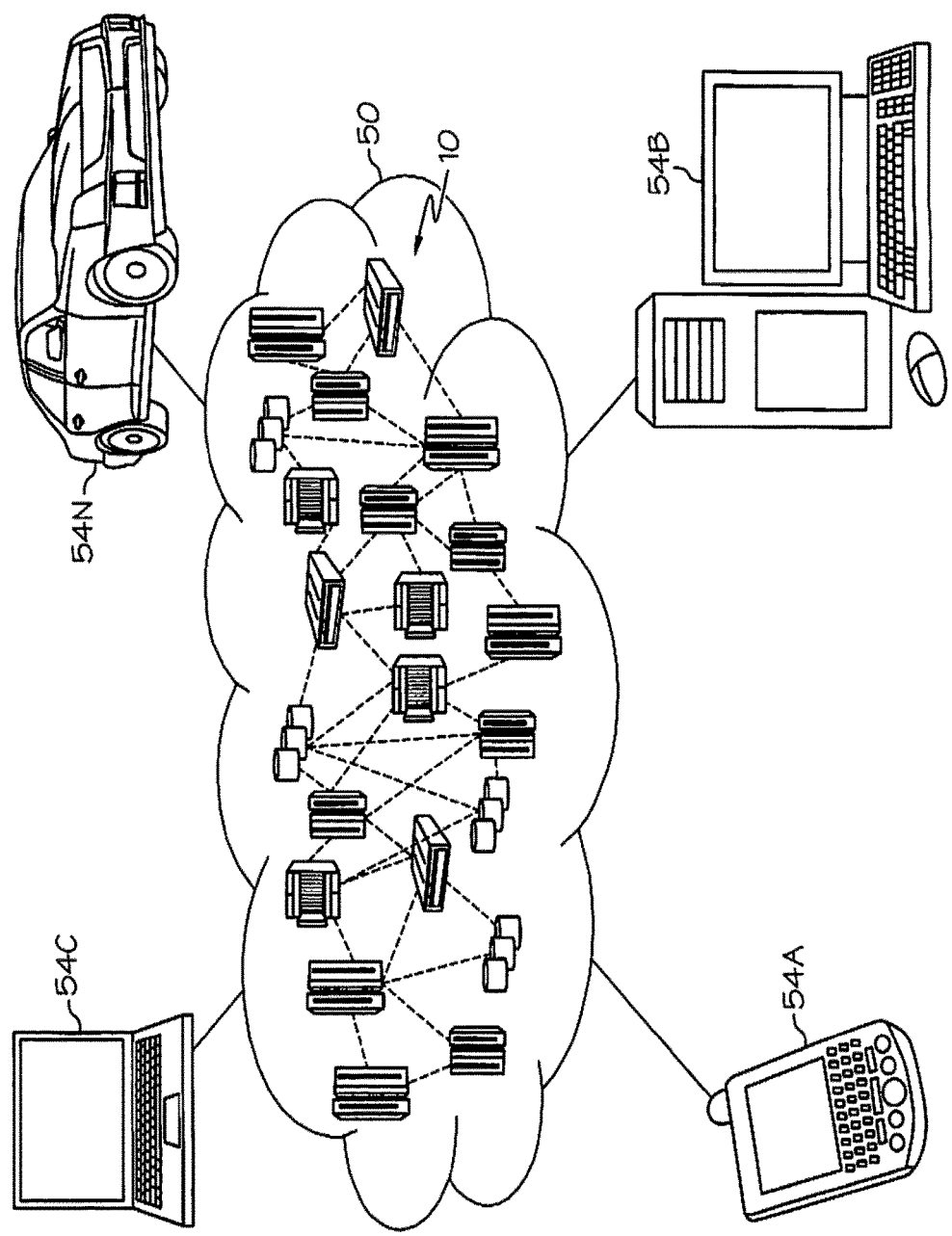
FIG. 4 illustrates a cloud computing environment, according to various embodiments.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 5:
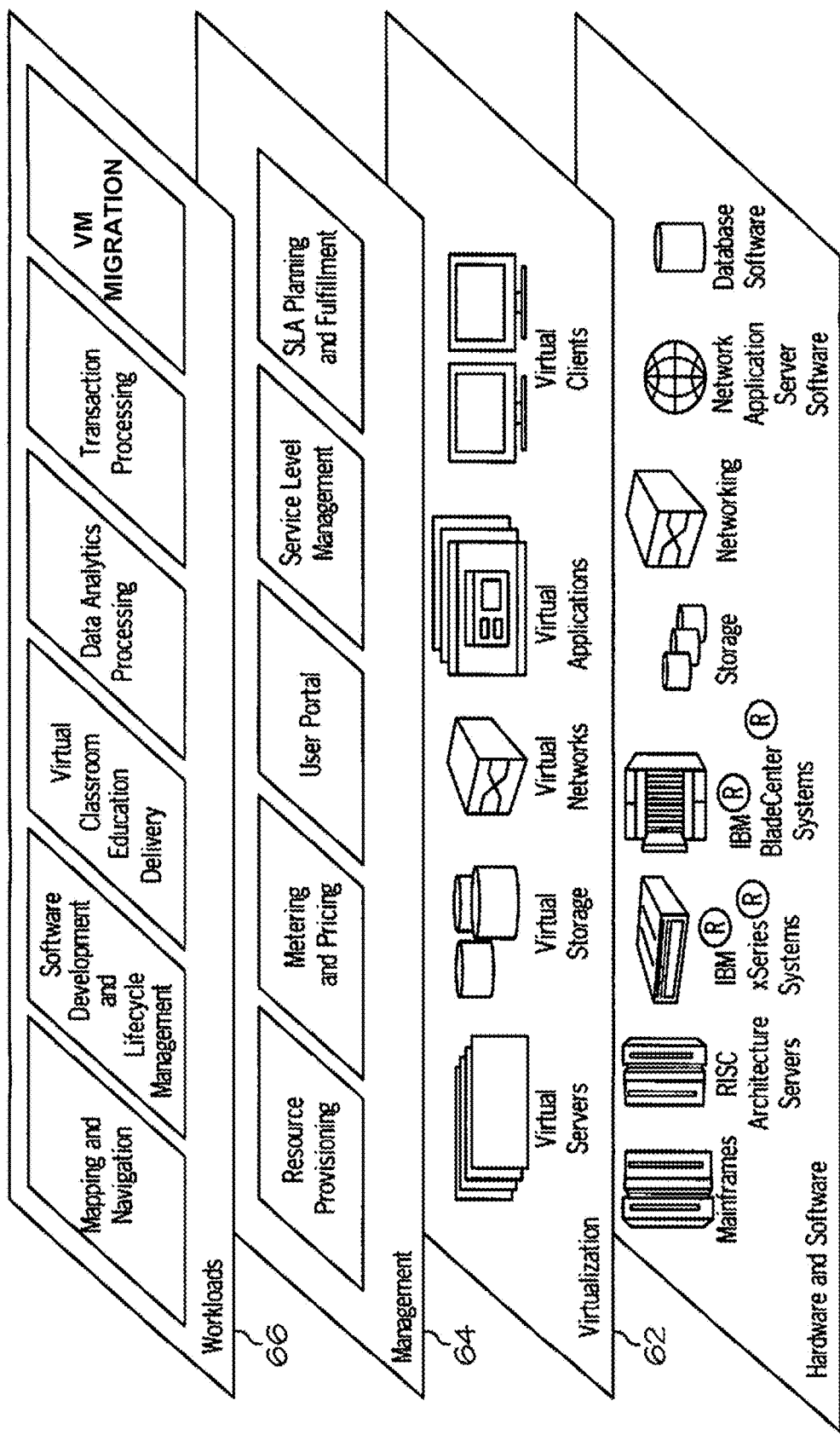
FIG. 5 illustrates a set of functional abstraction layers provided by the cloud computing environment, according to various embodiments.
Figure 8:
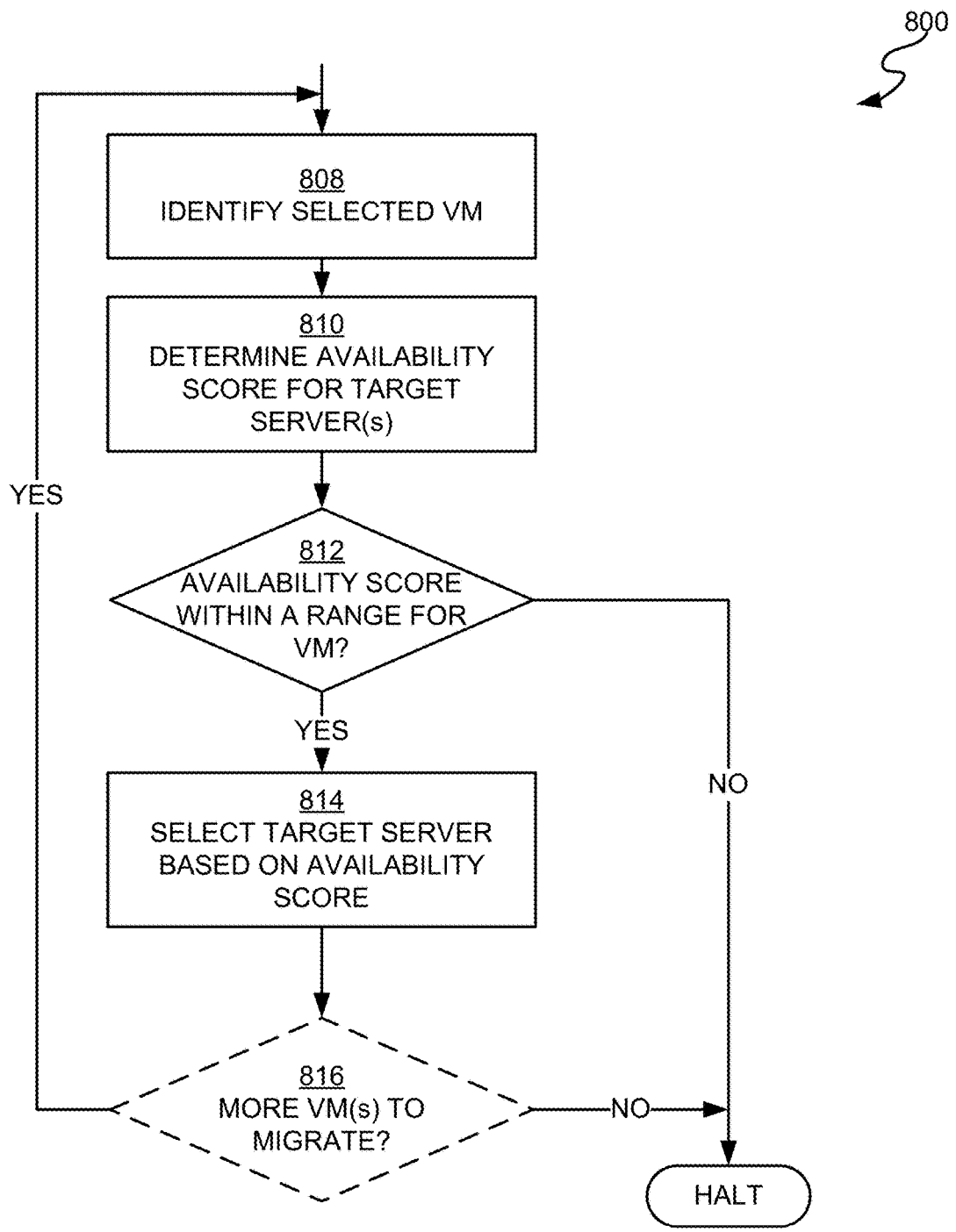
FIG. 8 illustrates a flowchart of a method for determining an available target server for a virtual machine, according to various embodiments.

Referring now to FIG. 5, a set of functional abstraction layers provided by cloud computing environment 50 (FIG. 4) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and virtual machine migration.

Figure 6:
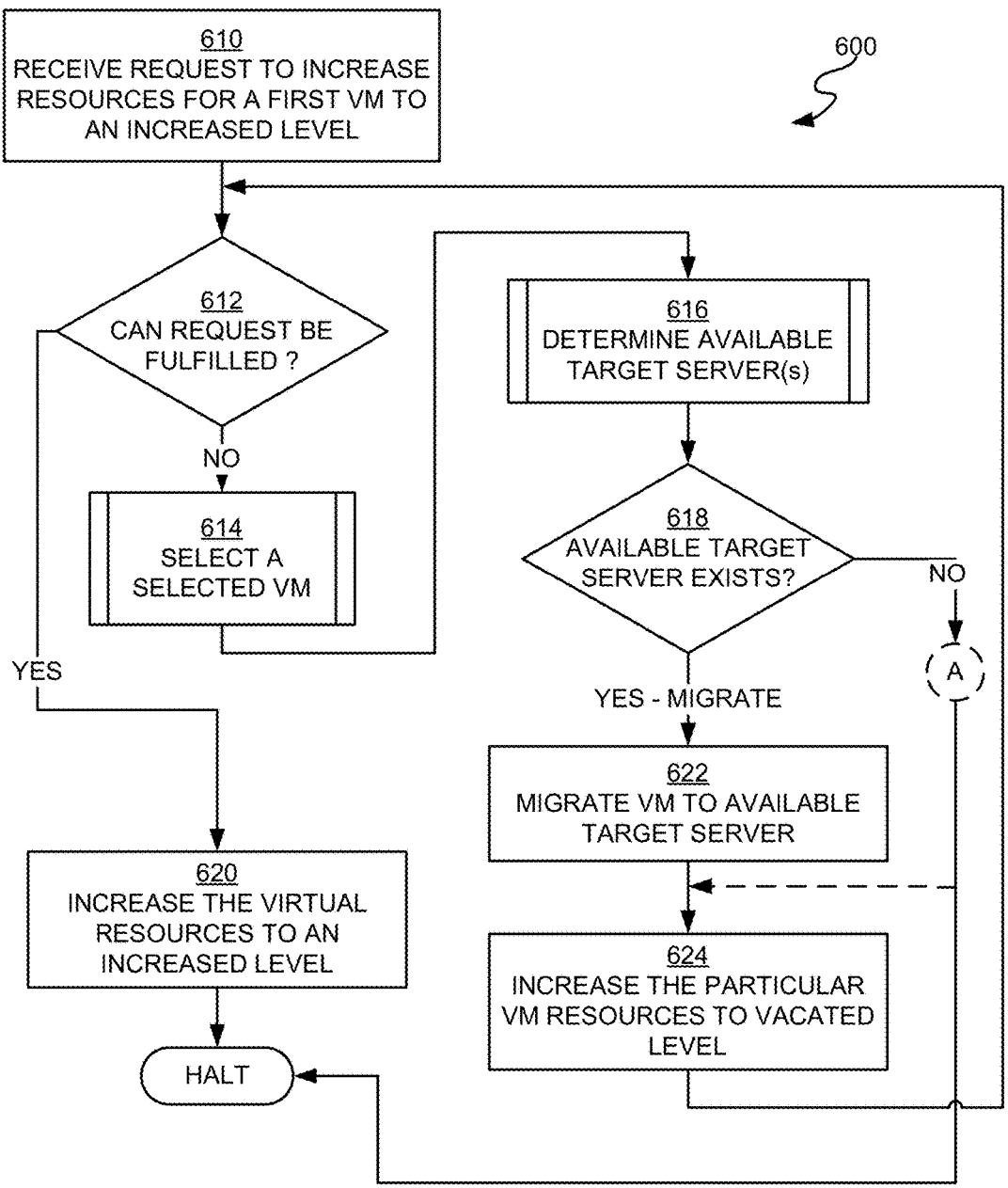
FIG. 6 illustrates a flowchart of a method for increasing virtual resources for a first virtual machine, according to various embodiments.

FIG. 6 illustrates a flowchart of a method 600 for increasing virtual resources for a first virtual machine, according to various embodiments. The first virtual machine may be hosted by a server of interest, which is also referred to as the first physical server. The server of interest provides virtual resources to a plurality of virtual machines, including the first virtual machine. A cloud controller receives a request for the first virtual machine to have the virtual resources increased to an increased level. Other virtual machines from the plurality of virtual machines, besides the first virtual machine (which may also be referred to as selected/second/secondary virtual machines), can be migrated to other physical servers in a cloud computing system or resized, which frees up virtual resources for the first virtual machine on the server of interest. The method 600 begins at operation 610.

In operation 610, the cloud controller receives a request to increase the virtual resources for a first virtual machine to an increased level. The first virtual machine receives virtual resources from a first physical server/hardware resource. An increased level of virtual resources corresponds to more virtual resources than an initial level of virtual resources for the first virtual machine. In various embodiments, the request originates from an administrative user and receives a high priority. The request can also originate from a user from the first virtual machine. Once the request is received, then the method 600 continues to operation 612.

In operation 612, the cloud controller determines whether the request for the increased level of virtual resources is able to be fulfilled by a free virtual resource for the physical server. The cloud controller examines the virtual resources allocated to the virtual machines on a physical server, e.g., the first physical server. The difference between the allocated virtual resources and the total virtual resources on the physical server may be referred to as the free virtual resources. The physical server may have enough free virtual resources to accommodate the increase of virtual resources for the first virtual machine to the increased level. In various embodiments, the cloud controller determines if there are sufficient free virtual resources on the first physical server to accommodate the first virtual resource at the increased level. Sufficient free resources may be defined based on the relationship between the free virtual resources and the increased first virtual resource. For example, if the free virtual resources on the first server are 20 CPU cycles, and the increased first virtual resources require 40 CPU cycles, then the free virtual resources would be insufficient for the increased first virtual resource. If so, then the method 600 continues to operation 620. If the physical server does not have enough free virtual resources to accommodate the increase of virtual resources (and not be able to be fulfilled), then the method 600 continues to operation 614.

In operation 620, the cloud controller increases the virtual resources of the first VM to the increased level. The virtual resources are reallocated from the free virtual resources of the first physical server. Aspects of operation 620 are described further herein. After the virtual resources are increased, then the method 600 halts.

In operation 614, the cloud controller selects a selected virtual machine on the first physical server. The selected virtual machine is selected from the plurality of virtual machines other than the first virtual machine, i.e., the other secondary virtual machines, that have been prioritized based on factors such as resource usage. The term selected virtual machine is also used interchangeably with the term second virtual machine. The selected virtual machine is a particular VM that is selected by the cloud controller on the basis of priority. The selected virtual machine, once identified, may be used by subsequent operations further described herein. The second VM can refer to a class of virtual machines rather than a specific virtual machine. For example, a plurality of second virtual machines may be selected by the cloud controller at a time.

The cloud controller can have a VM prioritization module configured to prioritize the selected virtual machines on the first physical server besides the first virtual machine. The VM prioritization module can use any ranking system to prioritize the other virtual machines. In various embodiments, more than one selected virtual machine is selected at a time. For example, if two selected virtual machines are selected, then both virtual machines may be migrated simultaneously to another physical server. Once a selected virtual machine is selected, then the method 600 continues to operation 616.

In operation 616, the cloud controller determines an available target server for the selected VM. In various embodiments, the cloud controller queries the available target server to determine if there are sufficient virtual resources available for the selected VM. The available target server is also referred to as a second physical server and can be used interchangeably. The cloud controller may have a resource analysis module that evaluates the performance factors on the plurality of physical servers to produce an availability score that is tailored for a particular VM.

The performance factors are factors that affect the performance of the physical server. Performance factors can include resource utilization. The availability score is a weighted score that is determined by weighting the performance factors on the physical server to produce an aggregated-type score. The availability score indicates the availability to a particular virtual machine and is described further herein. The available target server is found by analyzing performance factors on a plurality of physical servers. The performance factors may be weighed to produce an availability score that is tailored for the selected VM. The available target server can be selected from the physical server with the highest availability score for the selected VM. Once the available target servers are determined, then the method 600 continues to operation 618.

In operation 618, the cloud controller determines whether an available target server exists. An available target server for a selected VM corresponds to the existence of a migration path. The migration path represents an ability to migrate a virtual machine to another physical server. If there is a lack of an available target server, i.e., an unavailable target server because the available target server does not exist, due to lack of available target servers, then there may not be a migration path. In various embodiments, a lack of available target servers may be defined by targets servers without an appropriate availability score. The appropriate availability score may be defined by a range of acceptable availability scores. If the availability score for a physical server is not within the range, then the physical server is not available to the selected VM. The lack of an available target server for the selected VM may trigger a resize analysis for the selected VM. The cloud controller may analyze the secondary VMs on the physical server for resizing. This resize analysis determines whether any of the secondary VMs can be resized without performance degradation. The resize analysis continues in reference A and described further herein. In various embodiments, the resize analysis is optional. If there is no resize analysis available as an option, then the method 600 halts.

If there is a resize analysis available as an option, then the method 600 continues to reference A. As a result of the analysis on reference A, the method can either halt or continue to operation 624. For example, if the other virtual machines on the first physical server are not able to be resized, then the method 600 halts. If the other virtual machines on the first physical server are able to be resized, then the method 600 continues to operation 624 and the first VM receives increased virtual resources.

If there is not a resize analysis available as an option, then reference A is optional. The lack of an available target server may also cause the cloud controller to not fulfill the increasing of the virtual resources of the first VM and halt. According to various embodiments, the migration is preferred to the resizing of the selected VM because a migrated VM does not suffer any performance degradation whereas the resized VM may have to lower the virtual resources allocated. Once the available target server exists, then the method 600 continues to operation 622.

In operation 622, the cloud controller migrates the selected VM to the available target servers. Each migration can vary in terms of time. For example, the migration can be a Kernel-based Virtual Machine (KVM) migration and take place within 2 to 3 minutes. In various embodiments, the migration is iterative meaning that a single selected VM being migrated to a single available target server at one time and based on the change in the physical server hosting the first VM. Iterative can also mean that a group of selected VMs is migrated to one or more available target servers at one time. The migration of each selected VM to an available target server may take place in parallel to ensure that the migration occurs quickly. For example, in a server with 100 VMs to migrate, 5 VMs can migrate at a time to an available target server as opposed to 1 VM migration at a time.

The migration can also be non-iterative where a plurality of selected VMs are evaluated to migrate to one or more target servers without regard to the changes in the physical server hosting the first VM. In a non-iterative migration, the plurality of selected VMs can be migrated simultaneously to the target servers. Once the selected VM is migrated to an available target server, then the method 600 continues to operation 624.

In operation 624, virtual resources equal to the amount of virtual resources used by the migrated VM, i.e., the vacated level of virtual resources, will be freed on the first physical server as a result of the migration. The virtual resources for the first VM are increased by the amount of virtual resources freed by the migration, resizing of the selected VM, or a combination of migration and resizing of the selected VMs.

In various embodiments, there may be multiple secondary VMs migrated away from the first physical server in a single iteration. For example, multiple secondary VMs can be selected in operation 614 for migration to multiple target servers in operation 616. As the virtual resources are freed on the first physical server as a result of the migration of the secondary VMs, then the first VM is increased by available resources freed by the amount of each freed resource. The freed virtual resources may immediately be made available to a user.

Once the first VM has its resources increased, then the method 600 continues to operation 612. The cloud controller determines whether the original request is fulfilled with the increase of virtual resources in the first VM to the vacated level. In an example, a request for the first VM to increase to an increased level of 11 CPUs from 7 CPUs exists. There is a second VM with 2 CPUs, and a third VM with 5 CPUs on the first physical server. If the first physical server has a total 15 CPUs, then 1 CPU would be unallocated because 14 CPUs are allocated.

In this example, if the second VM is migrated to an available target server because the third VM is not able to be migrated, then the first VM would be allocated the 2 CPUs plus the 1 free CPU on the first physical server. Since the first VM is deficient by 1 CPU processing resource, then the third VM must be resized. If neither option is available, then the method 600 halts.

Figure 7:
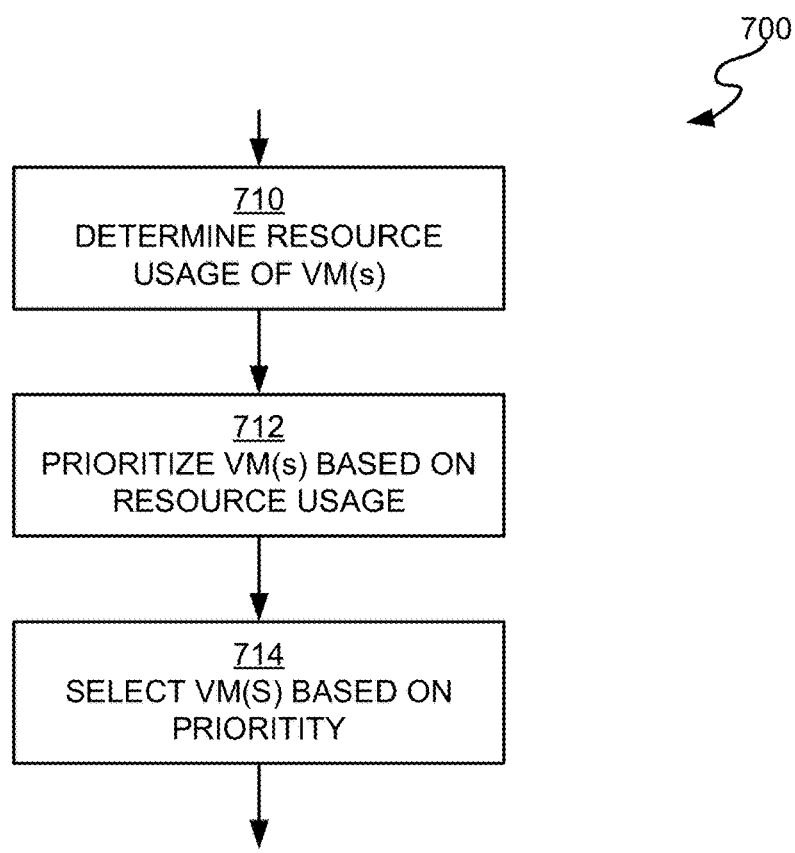
FIG. 7 illustrates a method of selecting a virtual machine on a server by the cloud controller, according to various embodiments.

FIG. 7 illustrates a method 700 of selecting a virtual machine on a server by the cloud controller, according to various embodiments. The method 700 may correspond to operation 614 from FIG. 6. The cloud controller can use a dedicated module such as a VM prioritization module to prioritize the virtual machines on a server. The cloud controller further takes the prioritized VMs and selects a VM based on the priority of the VMs on the server. The method 700 begins at operation 710.

In operation 710, the cloud controller determines the resource usage of the VM. The resource usage can be determined by a dedicated module, such as a resource analysis module. The resource analysis module can be configured to monitor the resources of the virtual machine on the first physical server. In various embodiments, the first virtual machine, or virtual machine of interest, is excluded from the monitoring. The resource analysis module measures the resource usage of a VM. The resource includes, but not limited to, a CPU processing resource, a memory resource, a network resource, a system time resource, and a storage resource.

The resource usage may be measured on an absolute basis or a relative basis. For example, on an absolute basis a processing resource for a VM can measure 1 million CPU cycles/second. However, on a relative basis, the 1 million CPU cycles/second can be 50% of the total CPU processing resource capacity allocated for the VM or 25% of the total CPU processing resource for the physical server. Once the resource usage is measured for the VM, then the method 700 continues to operation 712.

In operation 712, the cloud controller prioritizes the VMs based on the resource usage. The cloud controller can use a component such as a VM prioritization module to perform the prioritization based on readings from another component, e.g., the resource analysis module. The priority of the VMs can depend on the system policies. For example, the cloud controller can give a high priority to CPU processing resource but a low priority to a memory resource. Thus, for a first VM that requests more CPU processing resources, a selected VM that has a high memory resource usage but a low processing resource usage would have a lower overall priority than a third VM that has a low memory resource usage and a high processing resource usage. Once the VMs are prioritized, then the method 700 continues to operation 714.

In operation 714, the cloud controller selects the VM based on the priority of the VM. In various embodiments, the selection of the VMs is based on the number of VMs needed to migrate and the system policy. For example, if the VMs are migrated away from the first physical server one at a time, then there would be only one high priority VM selected. If the VMs are migrated away in groups, then there could be multiple VMs selected.

FIG. 8 illustrates a flowchart of a method 800 for determining an available target server for a virtual machine, according to various embodiments. The method 800 can correspond to operation 616 in FIG. 6. The method 800 involves a determination of the available target server for virtual machine by using a weighting function on performance factors to determine an availability score. The weighting function receives performance factors and applies different weights to the performance factors in order to produce the availability score for the target server. The weighting function can be an algorithm or software module used by the cloud controller and be described further herein. Once the availability score for the VM is determined, then the cloud controller selects the target server based on the availability score. The method 800 begins at operation 808.

In operation 808, the cloud controller identifies a selected VM from the first physical server. As mentioned herein, the selected VM can be determined based on the prioritization of a plurality of VMs. Information regarding the identity of the selected VM can be received from a VM prioritization module. The selected VM corresponds to the result from operation 614 in FIG. 6. Once the VM is identified, then the method 800 continues to operation 810.

In operation 810, the cloud controller determines an availability score for one or more target servers to which the selected VM is being migrated. In various embodiments, the target server is the same as a second physical server. The target server becomes an available target server based on the availability score, according to various embodiments. The cloud controller determines the performance factors for the target servers and applies a weighting function for each of the performance factors. The performance factors include CPU utilization, memory utilization, disk utilization/bandwidth, network utilization/bandwidth.

Each performance factor can have a different weight assigned to the performance factor by the cloud controller/resource analysis module. The weights for the performance factor depend on the system policy and the properties of the VM. For example, the cloud controller can assign a weight to the selected VM of 30% for CPU utilization and 60% for memory and 10% for network bandwidth to emphasize the priority of the memory virtual resource followed by the processing virtual resource.

The cloud controller applies a weighing function to the performance factors of the target servers. In various embodiments, the weights can be determined from the selected VM using statistical analysis. For example, if the selected VM has a CPU utilization of 10 million CPU cycles/second and a memory usage of 3 GB, and a network bandwidth of 2 GB/s (compared to an average usage of 12 million CPU cycles/second, a memory usage of 2 GB, and a network bandwidth of 3 GB/s for various VMs), then the cloud controller can assign a weight of 30% for CPU cycles/second, 60% for memory usage, and 10% for network bandwidth. The weight assignment can occur due to the selected VM being below average in CPU usage but above average in memory usage. Therefore, priority should be given toward target servers that provide more memory.

In various embodiments, the weight is based off of the % utilization of the selected VM's virtual resources. For example, if the VM is using 60% of the memory resource allocated to the VM, 30% of the allocated CPU resource, and 10% of the allocated network resource, then the weights can be 60% memory, 30% CPU, and 10% network bandwidth.

The weighing function applies the weight to each performance factor on the target servers to obtain an availability score. The availability score can take into account the virtual resource needs of the selected VM or produce a raw availability score. Using the aforementioned example, if there is a target server A that provides 5 GB of memory, 30 million CPU cycles, and 10 Gb/s of network bandwidth, and there is a target server B that provides 60 GB memory, 1 million CPU cycles, and 5 Gb/S of network bandwidth, then the availability score can be ((30*0.3)+(5*0.6)+(10*0.1))=13 for Server A, and 36.8 for Server B. Thus, target server B has the higher raw availability score.

However, the availability score can also be determined after the selected VM's performance requirements are met. For example, if the selected VM has a CPU utilization of 10 million CPU cycles/second and a memory usage of 3 GB, and a network bandwidth of 2 GB/s, then the target server B would be excluded from analysis because target server B does not have the necessary processing resources, despite having more memory resources than target server A. The availability score for target server A can be (30−10)0.3+(5−3)0.6+(5−2)0.1=7.5 while the availability score for target server B is 0 since the processing resource is not satisfied. In various embodiments, the determination of the availability score can occur on a component basis. For example, the cloud controller recognizes target server B the processing availability score of 0, the memory availability score of 34.2, and the network availability score of 0.3. Once the availability score is determined, then the method 800 continues to operation 812.

In operation 812, the cloud controller determines whether the availability score is within a range for the selected VM. The selected VM can have a range of acceptable values. The range is further compared to the availability score to determine if the target server is acceptable. For example, in the aforementioned example, if the availability range is 1-20, and the target server A is measured with an availability score of 7.5, then the method 800 continues to operation 814. If the availability score is outside of the range, then the method 800 halts. The cloud controller may initiate a notification to an administrator that the selected VM cannot be migrated.

In operation 814, the cloud controller selects the target server based on the availability score. The cloud controller can select the target server that has a higher availability score than other target servers. Once selected, the method 800 continues to operation 816.

In operation 816, the cloud controller determines if there are more selected VMs to migrate. In various embodiments, the VMs are selected in a single fashion. If the VMs are selected one at a time by the cloud controller, then operation 816 can be considered optional. However, if the VMs are selected as a group in prior operations, then the cloud controller determines if there are more selected VMs to migrate. If there are more selected VMs to migrate, then the method 800 continues to operation 808 where the selected VM is identified and method 800 continues. If there are no more selected VMs then the method 800 halts.

Figure 9:
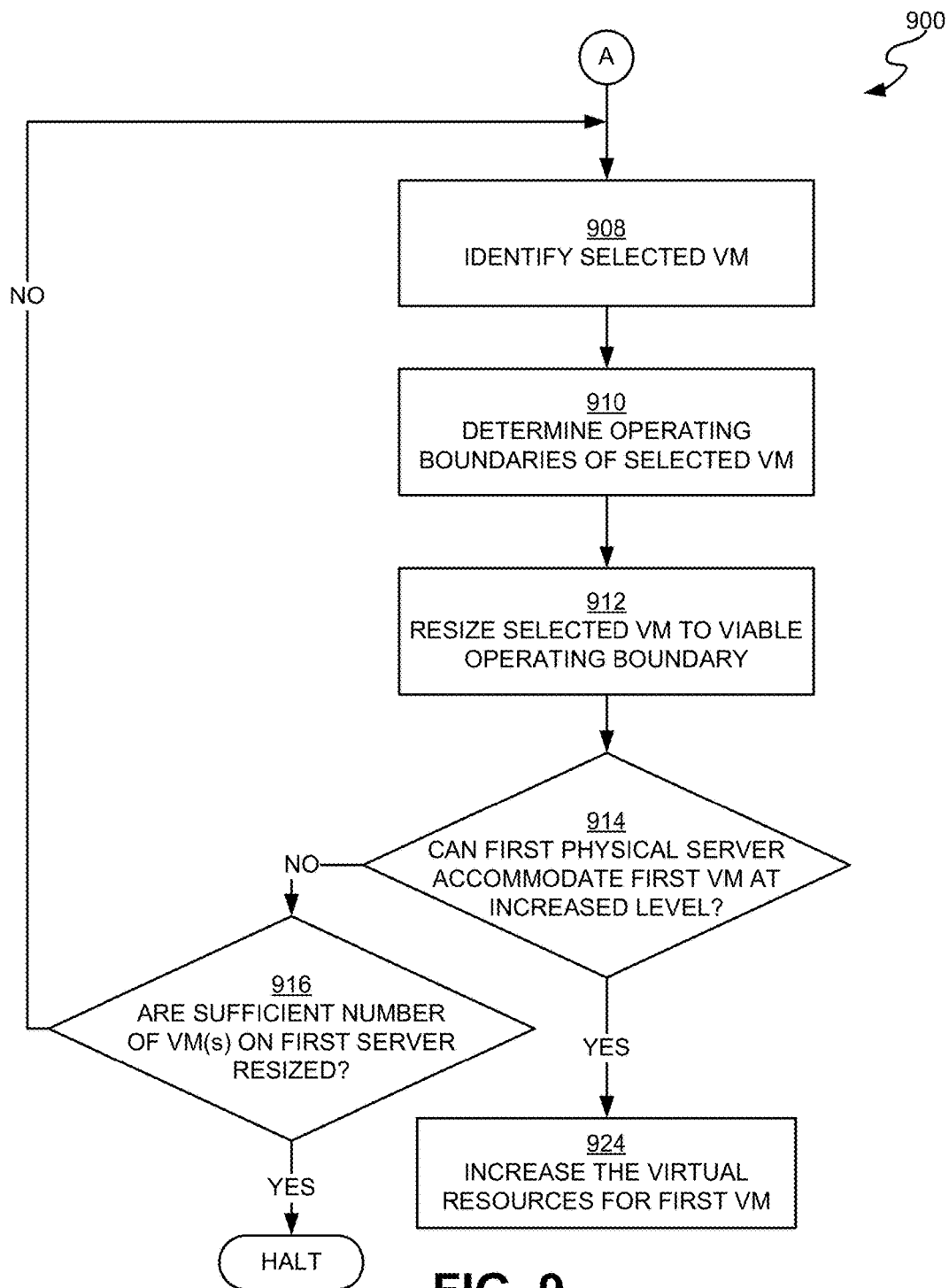
FIG. 9 illustrates a flowchart of a method for initiating a resize analysis, according to various embodiments.

FIG. 9 illustrates a flowchart of a method 900 for initiating a resize analysis, according to various embodiments. The method 900 continues from reference A in FIG. 6 if an available target server does not exist. The method 900 involves identifying the selected VM, e.g., the selected VM from operation 614 in FIG. 6, and determining the operating boundaries of the selected VM, and resizing the selected VM to a viable operating boundary. The viable operating boundary can be the minimum level of virtual resources required by the VM. The viable operating boundary can be determined by the historical usage of the VM and described further herein. The method 900 starts at operation 908. In operation 908, the cloud controller identifies the selected VM. The selected VM corresponds to the selected VM from operation 614 in FIG. 6. Once identified, the method 900 continues to operation 910.

In operation 910, the cloud controller determines the operating boundaries of the selected VM. A VM has established operating boundaries, e.g., a high boundary, a desired operation, and a low boundary. The operating boundaries may be determined based on statistical analysis of historical usage data. For example, a VM can perform 70% of its processing in a normal operation and use an average of 4 million CPU cycles/second. Under a low operating boundary, the VM can perform 15% of its processing at 2 million CPU cycles/second. During a high operating boundary, the VM can perform 15% of its processing at 6 million CPU cycles/second. The operating boundaries for each virtual resource can be determined for the selected VM. Once the operating boundaries of the selected VM are determined, then the method 900 continues to operation 912.

In operation 912, the cloud controller resizes the selected VM to a viable operating boundary. The viable operating boundary can be the lowest level of viable usage for the selected VM. In various embodiments, the viable operating boundary can be defined by a threshold. In various embodiments, operations of the selected VM may be restricted in order to keep the VM in the low operating boundary. For example, in a VM resized to the viable operating boundary, the cloud controller may attach limitations to the VM to avoid processing intensive tasks. Once the selected VM is resized, then method 900 continues to operation 914.

In operation 914, the cloud controller determines whether the first physical server can accommodate the first VM at the increased level. The cloud controller can compare the virtual resources required by the first VM at the increased level with the amount freed by the resize. In an example, the first physical server has a capacity of 25 million CPU cycles/second. The first VM is initially allocated 5 million CPU cycles/second and is requested to have 20 million CPU cycles/second at the increased level. If a selected VM is initially allocated 10 million CPU cycles/second, but resized to a viable operating boundary of 4 million CPU cycles/second, then the amount of unallocated resources is 25 million CPU cycles/second−5 million CPU cycles/second−4 million CPU cycles/second=16 million CPU cycles/second. Therefore, the first VM can be accommodated by the first physical server because 16 million CPU cycles/second available−15 million CPU cycles/second required >0. If the first physical server can accommodate the first VM, then the method 900 continues to operation 924. In operation 924, the cloud controller increases the virtual resources for the first VM to the increased level. If not, then the method 900 continues to operation 916.

In operation 916, the cloud controller determines whether a sufficient number of VMs on the first physical server have been resized. A sufficient number of VMs can be a number of VMs that are able to be resized so that the first physical server is able to accommodate the first VM at the increased level of virtual resources. A sufficient number of VMs can depend on the system policy. For example, if there are 5 VMs on the first physical server, and 4 are resized, then the cloud controller can determine that there are a sufficient number of VMs that are resized. If there are 2 VMs resized on the first physical server, and 1 more VM can be resized, then there is not a sufficient number of VMs resized. If there are not a sufficient number of VMs resized, then the method 900 continues to operation 908 where another VM is selected. If there are a sufficient number of VMs resized, then the method 900 halts since no more VMs on the first physical server can be resized and no more space can be increased by resizing.

FIGS. 10A, 10B, 10C, and 10D illustrate migration actions on various servers in response to an increase in the virtual processing resource for a virtual machine, according to various embodiments. A system has multiple processing resources, e.g., CPUs, hosted by four servers, e.g., first server, second server, third server, fourth server, that are shared with virtual machines 1-19. For example, VM1 initially utilizes 8 CPUs on the first server while VM19 is utilizes 4 CPUs on the fourth server. The excess capacity in the first server is being used to gradually increase the size of the first virtual machine, e.g., VM1. The virtual machines VM2-VM7 are migrating off to target servers. The number of concurrent migrations can be around 5 migrations occurring simultaneously, according to various embodiments.

Figures 10A, 10B:
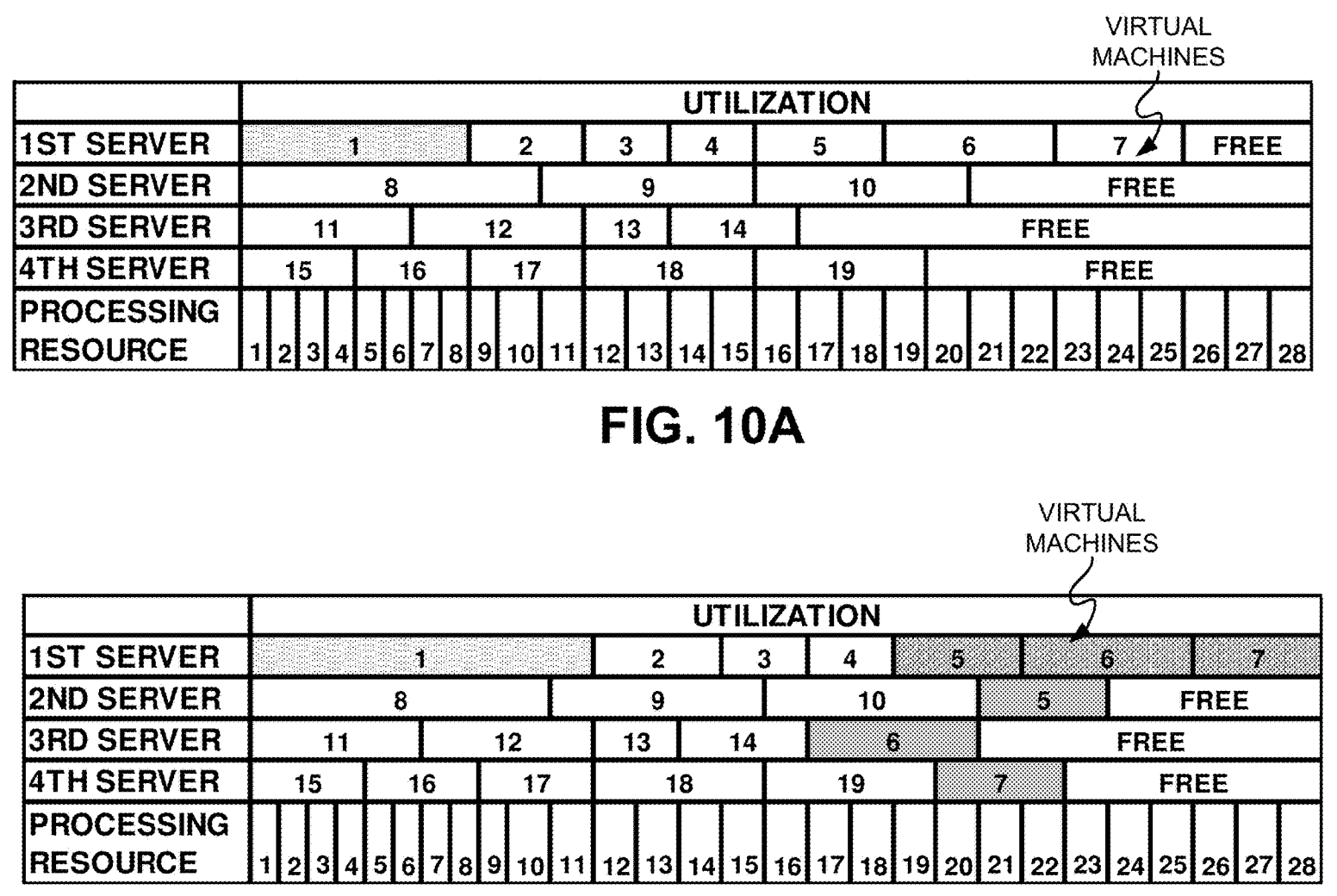

FIG. 10A illustrates an initial utilization of the system. A request for VM1 to utilize more processing resources is received. The cloud controller searches the first server for free processing resources to allocate to VM1. Once the free processing resources are allocated to VM1, then the secondary VMs can be selected.

FIG. 10B illustrates one iteration of the secondary VMs, e.g., VMS, VM6, and VM7, being migrated. In various embodiments, the VMs utilizing more processing resources, e.g., VM 5, VM6, and VM7, can be higher priority than other VMs, e.g., VM2, VM3, and VM4. Each secondary VM is evaluated for a target server based on the availability score described herein. For example, VM7 is evaluated for migration to the second, third, and fourth server. The fourth server may be determined to be available for VM7 based on the availability score. The third server is determined to be available for VM6, and the fourth server is determined to be available for VMS. The placement engine migrates a VM to the free space within a server. For example, VM7 is migrated to the free processing resource on the fourth server. Once migrated, the free processing resources are allocated to VM1 which increases the processing resources from 11 processing resources to 21 processing resources.

FIG. 10C illustrates one iteration of the secondary VMs, e.g., VM2, VM3, and VM4, according to various embodiments. The secondary VMs are migrates to the free processing resources on the second, third, or fourth servers. In this example, VM2 is migrated to the second server, VM3 is migrated to the third server, and VM4 is migrated to the fourth server.

FIG. 10D illustrates the first VM being increased from 21 processing resources to 28 processing resources. The first VM is allocated the processing resources freed by VM2, VM3, and VM4. Once increased, then the cloud controller determines whether the request for the increase to 28 processing resources is fulfilled.

Figure 11:
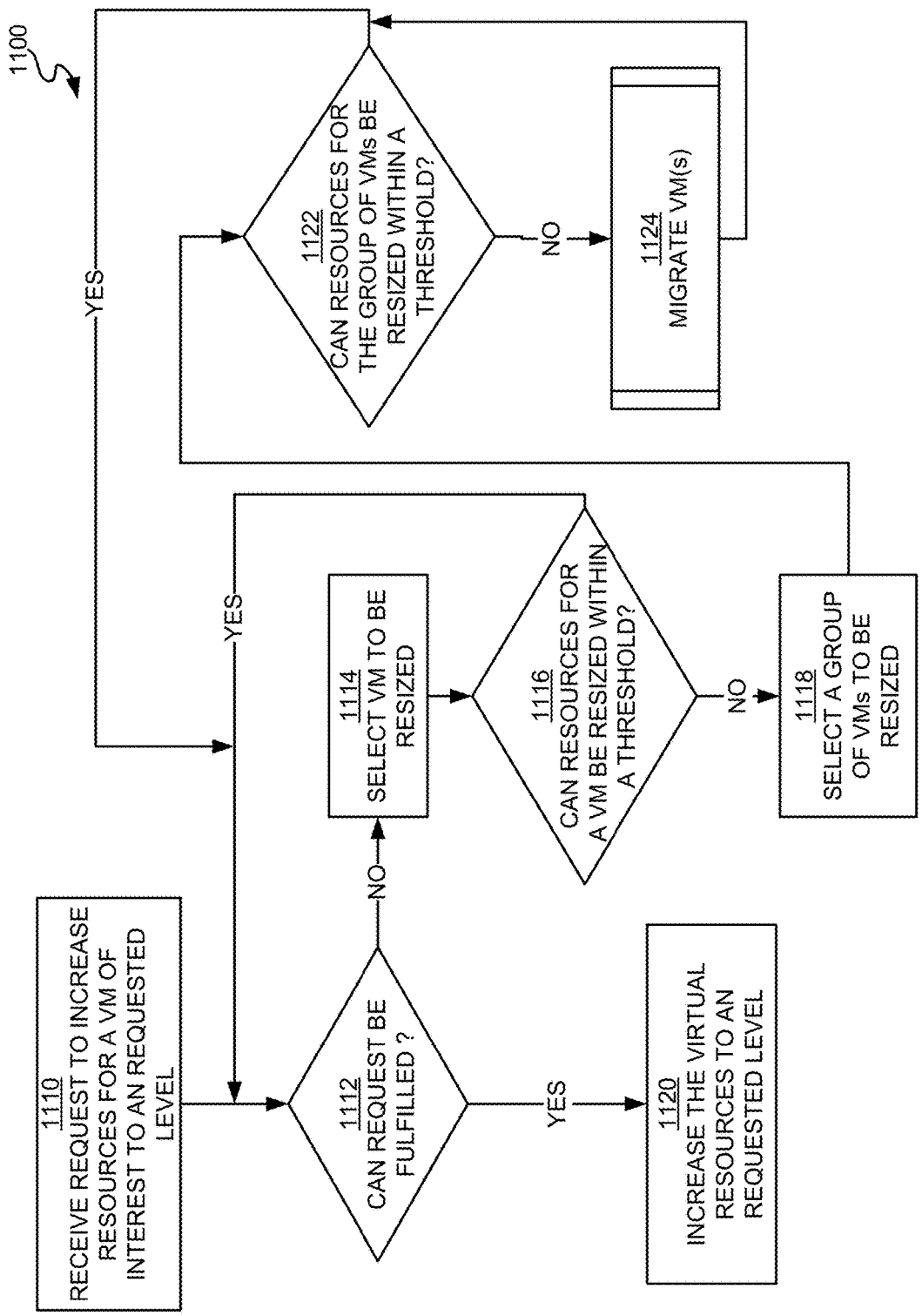
FIG. 11 illustrates a flowchart of a method 1100 of managing an increase of virtual resources for a virtual machine of interest to an increased level, according to various embodiments.

FIG. 11 illustrates a flowchart of a method 1100 of managing an increase of virtual resources for a virtual machine of interest to an increased level, according to various embodiments. A cloud controller may use the method 1100 to manage the cloud-based computing system, also referred to herein as a computing system, to accommodate the virtual machine of interest. The cloud controller can monitor a plurality of physical servers, e.g., cloud computing nodes, on a cloud-based computing system. Each of the physical servers provide an original level of virtual resources to a plurality of virtual machines. The cloud controller can increase the virtual machine of interest to a requested level which may be higher than the original level of virtual resources. Method 1100 begins at operation 1110.

In operation 1110, the cloud controller receives a request for a requested level of virtual resources for a virtual machine of interest. The requested level may be the same as the increased level of virtual resources. The requested level is different than the original level of virtual resources for the virtual machine of interest. In various embodiments, the requested level of virtual resources is lower than the original level of virtual resources. The virtual machine of interest is hosted by a first physical server from the plurality of physical servers. Once the request is received by the cloud controller, then the method 1100 continues to operation 1112.

In operation 1112, the cloud controller determines whether the request can be fulfilled by the first physical server. The cloud controller can examine the resources provided by the first physical server to determine whether the request can be fulfilled. For example, if the virtual machine of interest request 5 million CPU cycles/second of processing speed and 4 GB of memory from the first physical server, and the first physical server has 40 billion CPU cycles/second and 8 GB of memory, then the request can be fulfilled. If the request can be fulfilled, then the method 1100 continues to operation 1120. In operation 1120, the cloud controller can increase the allocation of the virtual resources for the virtual machine of interest to the requested level. If the request cannot be fulfilled, then the method 1100 continues to operation 1114.

According to various embodiments, the cloud controller may develop a path of migrations and resizing. The path results in the VM of interest obtaining the requested level of resources. The path can include any number of resizing actions and migration actions for a plurality of secondary VMs, i.e., VMs beside the VM of interest. The secondary VMs can include the VMs on a plurality of physical servers. The cloud controller can initiate the path with a schedule of actions, i.e., the resizing and migration actions. The schedule of actions indicates the sequence of resizing and migration actions taken on the plurality of VMs.

In various embodiments, resizing actions may be preferred over the migration actions due to a resize being faster and more reliable than a migration action because there is no tax on network infrastructure of storage fabric. Although the method 1100 illustrates an example of an iterative path, i.e., that the path is executed in blocks of resize actions and migration actions to determine the effect on the VM of interest, the path can be planned/simulated by the cloud controller. In various embodiments, the path can result in migration of the VM of interest. An example of a path is illustrated in operations 1114 through 1124.

In operation 1114, the cloud controller can select a secondary VM to be resized. The selection can incorporate operations from method 900 from FIG. 9. For instance, the cloud controller can select the secondary VM to be resized based on the analysis of the operating boundaries and select the secondary VM based on the difference between the viable operating boundary and a current operating boundary. Thus, a secondary VM with a large difference may create more unallocated virtual resources for the VM of interest. The unallocated virtual resources are the virtual resources that are not assigned to other secondary VMs. In various embodiments, a secondary VM may also be selected based on the amount of virtual resources allocated. For example, a secondary VM with a high amount of virtual resources allocated can potentially free up more virtual resources than a secondary VM with a small amount of virtual resources. In various embodiments, the secondary VM can be selected randomly. Once the secondary VM is selected, then the method 1100 continues to operation 1116.

In operation 1116, the cloud controller can determine whether the virtual resources for the secondary VM can be resized within an operating threshold. The secondary VM, or VM, can be resized from a high operating boundary to a viable operating boundary. To determine whether a VM will be viable, an operating threshold may be utilized. For example, if the VM requires an operating threshold of at least 3 billion CPU cycles/second, then any resize less than 3 billion CPU cycles/second would not be viable. Each VM may have a different operating threshold that depends on the viable operating level for each VM.

If the virtual resources can be resized to within the operating threshold, then the VM is resized to the viable operating level which is within the operating threshold. Once the VM is resized, then the method 1100 continues to operation 1112. In operation 1112, the cloud controller determines if the request for the VM of interest can be fulfilled by measuring unallocated virtual resources in the plurality of physical servers. If the request cannot be fulfilled, then another VM is selected to be resized. If the resources cannot be resized within the operating threshold, then the method 1100 continues to operation 1118.

In operation 1118, the cloud controller selects more than one secondary VM to resize. The selection of the secondary VMs can occur in a similar manner to selecting a single VM to resize in operation 1114. For instance, the group of VMs may be selected based on the size or randomly. The group size of the group of VMs may be determined based on a creation of projected unallocated virtual resources. For example, if a group of 4 secondary VMs have a difference of 6 million CPU cycles/second after resizing to a viable operating level, and the VM of interest requires 5 million CPU cycles/second at the requested level, then an additional secondary VM will not be selected. In another example, if a group of 4 secondary VMs have a different of 6 million CPU cycles/second after resizing to a viable operating level, and the VM of interest requires 8 million CPU cycles/second, then the group size is insufficient.

The secondary VM selected in operation 1114 may be a part of the group of secondary VMs in operation 1118. In various embodiments, the group of secondary VMs may be from the same physical server as the VM of interest. The group of secondary VMs can also include a plurality of secondary VMs on different physical servers as the VM of interest. For example, a group of secondary VMs can include 5 secondary VMs on the first physical server and 10 secondary VMs on a second physical server. The first physical server hosting the VM of interest. Once a group of secondary VMs are defined, then the method 1100 continues to operation 1122.

In operation 1122, the cloud controller may determine whether the resources for the group of secondary VMs can be resized within an operating threshold. The operating threshold may be an aggregate of all of the individual operating thresholds of the secondary VMs. For example, each secondary VM out of the group has an individual operating threshold to stay within the viable operating level. The cloud controller can ensure that each VM is within the operating threshold for the viable operating level.

An aggregate resize may be a coordinated transactional resize action across the group of VMs. In various embodiments, the cloud controller can also aggregate the operating thresholds for the group of secondary VMs. For example, if the group of VMs are to be resized to 10 million CPU cycles/second across all of the VMs, then individually each VM may be resized in a different proportion of resources. In this example, the cloud controller may determine that the operating threshold is 10 million CPU cycles/second for the group of VMs.

In this example, the resize may leave some secondary VMs to be resized past the operating threshold while leaving other secondary VMs to be resized within the operating threshold. The cloud controller may allow the resized group of secondary VMs to share the same resources in so that the resized secondary VMs do not get resized past the operating threshold.

If the group of secondary VMs cannot be resized within the operating threshold, then the method 1100 continues to operation 1112. In operation 1112, the cloud controller determines whether the request to increase the virtual resources for the virtual machine of interest. If not, then more secondary VMs can be resized. If the group of secondary VMs can be resized within an operating threshold, then the method 1100 can continue to operation 1124.

In operation 1124, the cloud controller can migrate secondary VMs to different physical servers. The migration may be similar to the migration in FIG. 8. The migration may also be for the path and involve multiple migrations. In various embodiments, the cloud controller can migrate a plurality of virtual machines to the plurality of physical servers with sufficient unallocated virtual resources in order to accommodate the virtual machine of interest. For example, if the cloud controller resizes 5 secondary VMs on the first physical server, and resizes 4 VMs on the second physical server, then the can migrate 1 secondary VM server on the first physical server to the second physical server and accommodate the virtual machine of interest.

In each migration, the cloud controller may determine whether the virtual machine of interest is able to be migrated to a second physical server from the plurality of servers, and migrate the virtual machine of interest to the second physical server. For example, if 4 secondary VMs are resized on the first physical server that is insufficient to create enough unallocated virtual resources for the VM of interest, and 5 secondary VMs are resized on the second physical server sufficient to create enough unallocated virtual resource for the VM of interest, then the VM of interest migrates to the second physical server. Once the migration occurs, then the method 1100 continues to operation 1112.

The implementation of the schedule of resize actions and migration actions can be considered implementing the path for the secondary virtual machines on the plurality of physical hosts. Once the request for the increase in virtual resources to the requested level can be fulfilled in operation 1112, then the increase of the virtual resources to the requested level for the virtual machine of interest can occur in operation 1120.

In various embodiments, the cloud controller may predict the number of migrating and resizing actions, i.e., the schedule of actions, that define a path. Once the number of migration and resizing actions is predicted, then the path can be validated against an action threshold. For instance, when predicting one or more paths, the cloud controller may select the path that results in the fewest number of scheduled actions. The cloud controller can also utilize the action threshold values to ensure that the paths are under the schedule of actions that would degrade system performance. For example, the action threshold may be 5 resizing and migration actions. If the schedule of actions indicates that there are 4 paths with one path having 6 resizing and migration actions, then the one path may be eliminated as an option. The action threshold may be formulated by a cloud computing administrator based on projected performance.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system comprising:
   a plurality of physical servers operating in a computing environment, a first physical server of the plurality of physical servers configured to provide virtual resources at an initial level to a plurality of virtual machines;
   a cloud controller that manages virtual resources for the plurality of virtual machines, the cloud controller configured to:
   monitor the plurality of physical servers, on a computing system, each of the plurality of physical servers provides an initial level of virtual resources to the plurality of virtual machines, wherein a first amount of virtual resources is allocated to a virtual machine of interest of the plurality of virtual machines, wherein the virtual resources include at least a first virtual resource;
   receive a request for an increased level of virtual resources for the virtual machine of interest hosted by the first physical server from the plurality of physical servers;
   determine that the first amount of virtual resources allocated to the virtual machine of interest exceeds the respective amounts of virtual resources allocated to each other virtual machine of the plurality of virtual machines;
   determine whether the first physical server is unable to provide the requested level of virtual resources to the virtual machine of interest, in response to determining that the first amount of virtual resources exceeds the respective amounts of virtual resources allocated to each of the other virtual machines;
   implement, in response to determining that the first physical server is not able to provide the requested level of resources for the virtual machine of interest and further in response to determining that a schedule of actions is within an action threshold, a path to accommodate the virtual machine of interest involving the increased level of virtual resources by executing the schedule of actions for a plurality of secondary virtual machines on the plurality of physical servers, the path implemented by:
      predicting the schedule of actions that define the path;
      determining whether the schedule of actions is within the action threshold, wherein the action threshold is a maximum number of scheduled actions that a path may include, wherein a scheduled action is one of a virtual machine migration and a virtual machine resizing;
      resizing the plurality of secondary virtual machines to create a first set of unallocated virtual resources, wherein each of the resized plurality of secondary virtual machines is smaller than a corresponding version in the plurality of secondary virtual machines;
      measuring unallocated virtual resources in the plurality of physical servers separate from the first physical server; and
      migrating at least one of the resized plurality of secondary virtual machines from the first physical server to the plurality of physical servers with sufficient unallocated virtual resources to accommodate the at least one of the resized plurality of secondary virtual machines to create a second set of unallocated virtual resources on the first physical server to accommodate the virtual machine of interest;
   implement the path for the secondary virtual machines on the plurality of physical servers; and
   following the migration of the at least one resized plurality of secondary virtual machines from the first physical server to the plurality of physical servers, increasing the virtual resources to the requested level for the virtual machine of interest by allocating the first set of unallocated virtual resources, and at least a portion of the second set of unallocated virtual resources on the first physical server to the virtual machine of interest.

2. The system of claim 1, wherein the cloud controller is further configured to:
   increase, in response to the first physical server being able to host the requested level of resources for the virtual machine of interest, the virtual resources to the requested level for the virtual machine of interest on the first physical server, wherein migrating the plurality of virtual machines includes:
      determining whether the virtual machine of interest is able to be migrated to a second physical server from the plurality of servers; and
      migrating the virtual machine of interest to the second physical server in response to the virtual machine of interest being able to be migrated to the second physical server.

3. The system of claim 1, wherein resizing the plurality of secondary virtual machines includes:
   determining an operating threshold of the plurality of secondary virtual machines; and
   resizing the plurality of secondary virtual machines to the operating threshold.

4. The system of claim 1, wherein the at least one of the resized plurality of secondary virtual machines includes a second amount of virtual resources that is less than the first amount of virtual resources, the method further comprising:
   selecting the at least one of the resized plurality of secondary virtual machines, wherein the selecting the at least one of the resized plurality of secondary virtual machines is based on a priority of the plurality of secondary virtual machines, wherein the selecting the at least one of the resized plurality of secondary virtual machines further comprises:
      monitoring resource usages of each virtual machine of the plurality of secondary virtual machines on the first physical server, wherein the monitored resources include CPU processing, memory, network, system timing, and storage;
      determining resource usages of each virtual machine of the plurality of secondary virtual machines relative to a total amount of computing resources of the first physical server; and
      prioritizing each virtual machine of the plurality of secondary virtual machines based on resource usage, wherein virtual machines having lower resource usages are prioritized over virtual machines having higher resource usages.

5. The system of claim 1, wherein migrating the at least one of the resized plurality of secondary virtual machines from the first physical server to the one of the plurality of physical servers is based in part on an availability score of the one of the plurality of physical servers that satisfies a predetermined threshold, wherein the migrating the at least one of the resized plurality of secondary virtual machines further comprises:

receiving one or more performance factors from the plurality of physical servers, wherein the performance factors include CPU utilization, memory utilization, disk bandwidth, and network utilization;

determining the availability score of each of the plurality of physical servers based on applying a weighting function to the one or more performance factors, wherein the weighting function depends in part on a system policy and properties of each physical server, wherein the availability score for a particular server is a numerical representation of whether the particular server can host the at least one of the resized plurality of secondary virtual machines, wherein the system policy includes determining a weight for each prioritizing resource based on resource utilization of the at least one of the resized plurality of secondary virtual machines;

prioritizing each physical server of the plurality of physical servers based on their respective availability scores; and determining that the availability score for the one of the plurality of physical servers satisfies the predetermined threshold.

6. The system of claim 1, wherein the cloud controller is further configured to:

determine an operating boundary of the at least one of the plurality of secondary virtual machines by:

determining a viable operating boundary for the at least one of the plurality of secondary virtual machines, the viable operating boundary being the amount of virtual resources required to complete any tasks assigned to the at least one of the plurality of secondary virtual machines;

determining a current operating boundary for the at least one of the plurality of secondary virtual machines, the current operating boundary being the amount of resources currently allocated to the at least one of the plurality of secondary virtual machines; and determining the operating boundary by determining a difference between the viable operating boundary from the current operating boundary;

allocate resources from the at least one of the plurality of secondary virtual machines to the virtual machine of interest until reaching the operating boundary of the at least one of the plurality of secondary virtual machines; and develop the path based on the allocated resources, wherein migrating the at least one of the plurality of secondary virtual machines from the first physical server to a particular server of the plurality of physical servers is based in part on the developed path, wherein the path is a combination of migrating and resizing virtual machines for the first virtual resource to accommodate the virtual machine of interest, wherein developing the path further includes:

generating a first path that includes a least amount of migrations necessary to accommodate the increased level of the first virtual resource for the virtual machine of interest;

generating a second path that includes a least amount of resizing of virtual machines necessary to accommodate an increased level of the first virtual resource for the virtual machine of interest;

simulating the first and second paths to determine resources requirements for the first and second paths; and selecting the path having the lowest resource requirements based on the simulating.

7. A computer program product comprising a computer readable storage device having a computer readable program stored therein, wherein the computer readable program, when executed on a computing device, causes the computing device to:

monitor a plurality of physical servers, on a computing system, that each provide an initial level of virtual resources to a plurality of virtual machines, wherein a first amount of virtual resources is allocated to a virtual machine of interest of the plurality of virtual machines, wherein the virtual resources include at least a first virtual resource;

receive a request for an increased level of virtual resources for the virtual machine of interest hosted by a first physical server from the plurality of physical servers;

determine that the first amount of virtual resources allocated to the virtual machine of interest exceeds the respective amounts of virtual resources allocated to each other virtual machine of the plurality of virtual machines;

determine whether the first physical server is unable to provide the requested level of virtual resources for the virtual machine of interest, in response to determining that the first amount of computing resources exceeds the respective amounts of computing resources allocated to each of the other virtual machines;

implement, in response to determining that the first physical server is not able to provide the requested level of resources for the virtual machine of interest and further in response to determining that a schedule of actions is within an action threshold, a path to accommodate the virtual machine of interest involving the increased level of virtual resources by executing the schedule of actions for a plurality of secondary virtual machines on the plurality of physical servers, the path implemented by:

predicting the schedule of actions that define the path;

determining whether the schedule of actions is within the action threshold, wherein the action threshold is a maximum number of scheduled actions that a path may include, wherein a scheduled action is one of a virtual machine migration and a virtual machine resizing;

resizing the plurality of secondary virtual machines to create a first set of unallocated virtual resources wherein each of the resized plurality of secondary virtual machines is smaller than a corresponding version in the plurality of secondary virtual machines;

measuring unallocated virtual resources in the plurality of physical servers separate from the first physical server; and migrating at least one of the resized plurality of secondary virtual machines from the first physical server to the plurality of physical servers with sufficient unallocated virtual resources to accommodate the at least one of the resized plurality of secondary virtual machines to create a second set of unallocated virtual resources so that the first physical server has sufficient unallocated virtual resources on the first physical server to accommodate the virtual machine of interest; and increase, in response to the first physical server having sufficient unallocated virtual resources to accommodate the virtual machine of interest, the virtual resources on the first physical server to the requested level for the virtual machine of interest by allocating the first set of unallocated virtual resources, and at least a portion of the second set of unallocated virtual resources on the first physical server to the virtual machine of interest.

8. The computer program product of claim 7, wherein the virtual machine of interest is able to be migrated in response to a second physical server having sufficient unallocated virtual resources for the virtual machine of interest, wherein the computer readable program causes the computing device to implement the path by:

determining whether the virtual machine of interest is able to be migrated to the second physical server from the plurality of servers; and migrating the virtual machine of interest to the second physical server in response to the virtual machine of interest being able to be migrated to the second physical server.

9. The computer program product of claim 7, wherein resizing the plurality of secondary virtual machines includes:

determining an operating threshold of the plurality of secondary virtual machines; and resizing the plurality of secondary virtual machines to the operating threshold, and wherein the computer readable program causes the computing device to:

increase the virtual resources to the requested level for the virtual machine of interest.

10. The computer program product of claim 7, wherein the at least one of the resized plurality of secondary virtual machines includes a second amount of virtual resources that is less than the first amount of virtual resources, the method further comprising:

selecting the at least one of the resized plurality of secondary virtual machines, wherein the selecting the at least one of the resized plurality of secondary virtual machines is based on a priority of the plurality of secondary virtual machines, wherein the selecting the at least one of the resized plurality of secondary virtual machines further comprises:

monitoring resource usages of each virtual machine of the plurality of secondary virtual machines on the first physical server, wherein the monitored resources include CPU processing, memory, network, system timing, and storage;

determining resource usages of each virtual machine of the plurality of secondary virtual machines relative to a total amount of virtual resources of the first physical server; and prioritizing each virtual machine of the plurality of secondary virtual machines based on resource usage, wherein virtual machines having lower resource usages are prioritized over virtual machines having higher resource usages.

11. The computer program product of claim 7, wherein migrating the at least one of the resized plurality of secondary virtual machines from the first physical server to the one of the plurality of physical servers is based in part on an availability score of the one of the plurality of physical servers that satisfies a predetermined threshold, wherein the migrating the at least one of the resized plurality of secondary virtual machines further comprises:

receiving one or more performance factors from the plurality of physical servers, wherein the performance factors include CPU utilization, memory utilization, disk utilization, and network utilization;

determining the availability score of each of the plurality of physical servers based on applying a weighting function to the one or more performance factors, wherein the weighting function depends in part on a system policy and properties of each physical server, wherein the availability score for a particular server is a numerical representation of whether the particular server can host the at least one of the resized plurality of secondary virtual machines, wherein the system policy includes determining a weight for each virtual resource based on resource utilization of the at least one of the resized plurality of secondary virtual machines;

prioritizing each physical server of the plurality of physical servers based on their respective availability scores; and determining that the availability score for the one of the plurality of physical servers satisfies the predetermined threshold.

12. The computer program product of claim 7, wherein the computer readable program further causes the computing device to:

determine an operating boundary of the at least one of the plurality of secondary virtual machines by:

determining a viable operating boundary for the at least one of the plurality of secondary virtual machines, the viable operating boundary being the amount of virtual resources required to complete any tasks assigned to the at least one of the plurality of secondary virtual machines;

determining a current operating boundary for the at least one of the plurality of secondary virtual machines, the current operating boundary being the amount of resources currently allocated to the at least one of the plurality of secondary virtual machines; and determining the operating boundary by determining a difference between the viable operating boundary from the current operating boundary;

allocate resources from the at least one of the plurality of secondary virtual machines to the virtual machine of interest until reaching the operating boundary of the at least one of the plurality of secondary virtual machines; and develop the path based on the allocated resources, wherein migrating the at least one of the plurality of secondary virtual machines from the first physical server to a particular server of the plurality of physical servers is based in part on the developed path, wherein the path is a combination of migrating and resizing virtual machines for the first virtual resource to accommodate the virtual machine of interest, wherein developing the path further includes:

generating a first path that includes a least amount of migrations necessary to accommodate the increased level of the first virtual resource for the virtual machine of interest;

generating a second path that includes a least amount of resizing of virtual machines necessary to accommodate an increased level of the first virtual resource for the virtual machine of interest;

simulating the first and second paths to determine resources requirements for the first and second paths; and selecting the path having the lowest resource requirements based on the simulating.

* * * * *